US012615173B2

(12) United States Patent
Liu et al.

(10) Patent No.: US 12,615,173 B2
(45) Date of Patent: Apr. 28, 2026

(54) ELECTRONIC DEVICE BASED ON UNIFIED NON-ORTHOGONAL WAVEFORM

(71) Applicant: NTT DOCOMO, INC., Tokyo (JP)

(72) Inventors: Juan Liu, Beijing (CN); Wenjia Liu, Beijing (CN); Xiaolin Hou, Beijing (CN); Anxin Li, Beijing (CN); Lan Chen, Beijing (CN); Yoshihisa Kishiyama, Tokyo (JP); Takahiro Asai, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 35 days.

(21) Appl. No.: 18/579,198

(22) PCT Filed: Aug. 10, 2021

(86) PCT No.: PCT/CN2021/111823
§ 371 (c)(1),
(2) Date: Jan. 12, 2024

(87) PCT Pub. No.: WO2023/015451
PCT Pub. Date: Feb. 16, 2023

(65) Prior Publication Data
US 2024/0323063 A1 Sep. 26, 2024

(51) Int. Cl.
*H04L 25/03* (2006.01)
*H04B 1/7097* (2011.01)
*H04L 1/00* (2006.01)
*H04L 27/26* (2006.01)

(52) U.S. Cl.
CPC ..... *H04L 25/03178* (2013.01); *H04B 1/7097* (2013.01); *H04L 1/0057* (2013.01); *H04L 27/2636* (2013.01)

(58) Field of Classification Search
CPC ............. H04L 25/03178; H04L 1/0057; H04L 27/2636; H04L 25/02; H04L 27/26; H04B 1/7097
See application file for complete search history.

(56) References Cited

U.S. PATENT DOCUMENTS

| | | | |
|---|---|---|---|
| 2003/0148781 A1* | 8/2003 | Sommer | H04W 52/221 |
| | | | 455/423 |
| 2018/0198662 A1* | 7/2018 | Sahin | H04L 25/03834 |
| 2019/0097859 A1 | 3/2019 | Bala et al. | |

(Continued)

OTHER PUBLICATIONS

Machine translation of JP-2008113240-A (Year: 2008).*

*Primary Examiner* — Jean B Corrielus
(74) *Attorney, Agent, or Firm* — Osha Bergman Watanabe & Burton LLP

(57) ABSTRACT

The present disclosure provides electronic equipment. The electronic equipment includes: an input unit, configured to: determine a sequence to be compressed based on a data sequence, a head sequence and a tail sequence, wherein the sequence to be compressed has Q elements, and Q is an integer greater than 0; a processing unit, configured to: determine, based on the sequence to be compressed, a DFT spreading sequence by utilizing DFT spreading, and perform at least one of data deleting operation or data superposing operation on the DFT spreading sequence to determine a compressed sequence, wherein the compressed sequence has M symbols, M is an integer greater than 0, and M is less than Q.

6 Claims, 9 Drawing Sheets

9000

S9001 — Determine a sequence to be compressed based on a data sequence, a header sequence and a trailer sequence, wherein the sequence to be compressed has $Q$ elements, and $Q$ is an integer greater than 0

S9002 — Determine, based on the sequence to be compressed, a DFT spreading sequence by utilizing DFT spreading, and performs at least one of data deleting operation or data superposing operation on the DFT spreading sequence, to determine a compressed sequence, wherein the compressed sequence has $M$ symbols, $M$ is an integer greater than 0, and $M$ is less than $Q$

(56)                    References Cited

U.S. PATENT DOCUMENTS

2019/0182813  A1*   6/2019   Yamamoto .......... H04L 27/2646
2019/0222455  A1*   7/2019   Sahin .................. H04L 27/2613
2020/0036557  A1*   1/2020   Kneissl ............ H04L 27/26132
2020/0052740  A1*   2/2020   Zhang .................. H04L 5/0048
2020/0052948  A1*   2/2020   Sahin .................. H04L 27/2607

* cited by examiner

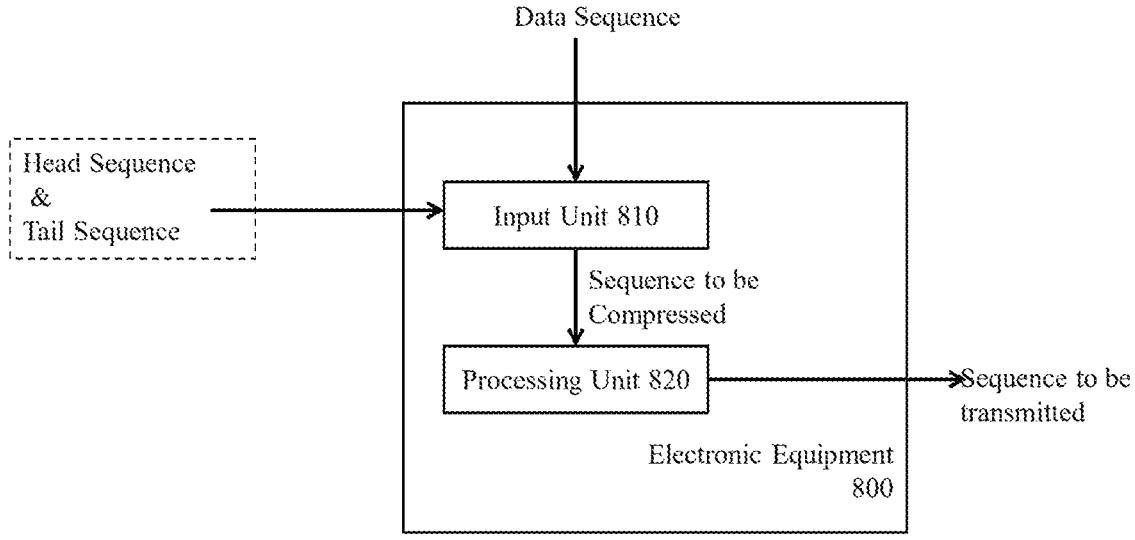

S9001 — Determine a sequence to be compressed based on a data sequence, a header sequence and a trailer sequence, wherein the sequence to be compressed has $Q$ elements, and $Q$ is an integer greater than 0

S9002 — Determine, based on the sequence to be compressed, a DFT spreading sequence by utilizing DFT spreading, and performs at least one of data deleting operation or data superposing operation on the DFT spreading sequence, to determine a compressed sequence, wherein the compressed sequence has $M$ symbols, $M$ is an integer greater than 0, and $M$ is less than $Q$

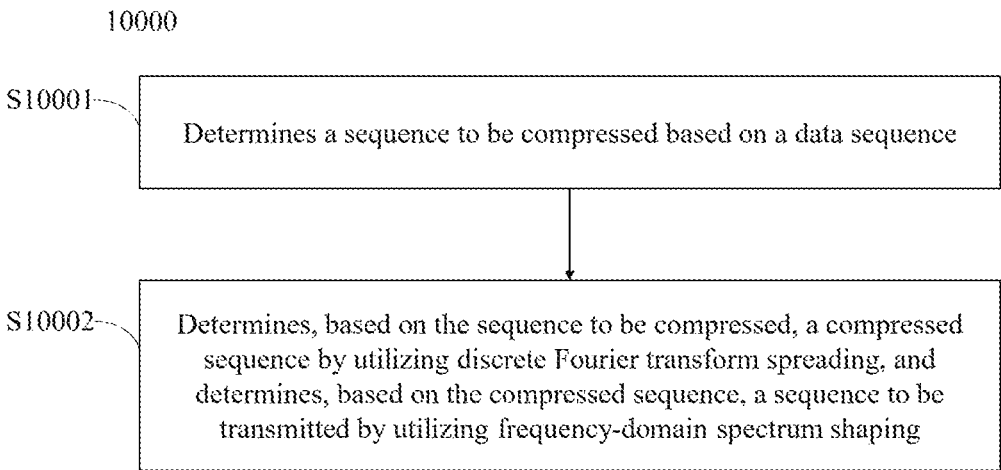

S10001 — Determines a sequence to be compressed based on a data sequence

S10002 — Determines, based on the sequence to be compressed, a compressed sequence by utilizing discrete Fourier transform spreading, and determines, based on the compressed sequence, a sequence to be transmitted by utilizing frequency-domain spectrum shaping

FIG. 10

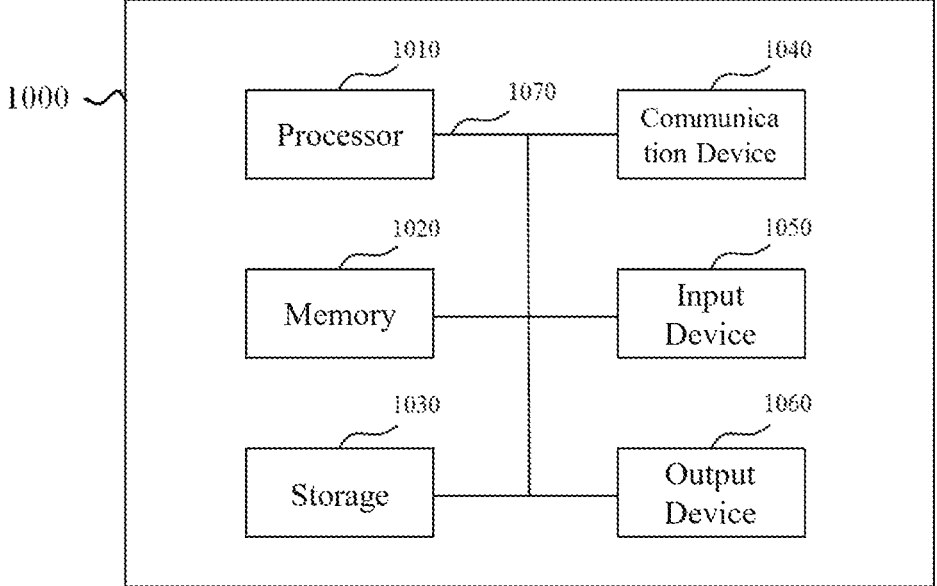

1000

1010 Processor
1070
1040 Communication Device
1020 Memory
1050 Input Device
1030 Storage
1060 Output Device

FIG. 11

ELECTRONIC DEVICE BASED ON UNIFIED NON-ORTHOGONAL WAVEFORM

TECHNICAL FIELD

The present disclosure relates to the field of wireless communication, specifically to electronic equipment, and more specifically to electronic equipment based on unified non-orthogonal waveform.

BACKGROUND

The future 6G communication systems propose a higher requirement for peak to average power ratio (PAPR) of waveforms. Discrete Fourier transform spread orthogonal frequency division multiplexing (DFT-s-OFDM), which is an existing uplink waveform of 5G system, has a lower PAPR and is one of the important candidate waveforms of 6G. However, the current DFT-s-OFDM scheme still cannot meet the requirements for 5G evolution communication systems and the requirements for 6G communication systems. In addition, the 6G communication systems further propose a higher requirement for out-of-band emission (OOBE) and spectrum efficiency (SE) of the waveform. At present, many improvement schemes for DFT-s-OFDM have been proposed. However, such improvement schemes can only boost one or at most two of the performance indexes of PAPR, OOBE or SE, while cannot boost the above three indexes at the same time. In addition, it is difficult for the current improvement schemes to be integrated with the framework of 6G communication systems due to their bad compatibility and flexibility. Thus there is still a difficulty in their application in 6G communication systems.

Therefore, it is required to further improve DFT-s-OFDM to increase the performances of PAPR, OOBE and SE of the waveform at the same time, and to integrate the waveform with the framework of 6G communication systems to increase the compatibility and flexibility.

SUMMARY

According to an aspect of the present disclosure, there is provided an electronic equipment, comprising: an input unit, configured to: determine a sequence to be compressed based on a data sequence, a head sequence and a tail sequence, wherein the sequence to be compressed has Q elements, and Q is an integer greater than 0; a processing unit, configured to: determine, based on the sequence to be compressed, a DFT spreading sequence by utilizing DFT spreading, and perform at least one of data deleting operation or data superposing operation on the DFT spreading sequence to determine a compressed sequence, wherein the compressed sequence has M symbols, M is an integer greater than 0, and M is less than Q.

For example, the processing unit is further configured to: compress the head sequence and the tail sequence in the sequence to be compressed by a first compression factor, and compress the data sequence in the sequence to be compressed by a second compression factor, wherein the first compression factor indicates a ratio of the data amount of the head sequence and the tail sequence in the sequence to be compressed to the data amount of the head sequence and the tail sequence in the compressed sequence, the second compression factor indicates a ratio of the data amount of the data sequence in the sequence to be compressed to the data amount of the data sequence in the compressed sequence, and the first compression factor is the same as or different from the second compression factor.

For example, the processing unit is further configured to: perform zero-padding operation on the sequence to be compressed according to at least the first compression factor and/or the second compression factor, to determine a zero-embedded sequence, and perform DFT spreading operation on the zero-embedded sequence, to determine the DFT spreading sequence.

For example, the processing unit is further configured to: perform data removing operation on the DFT spreading sequence, to determine the compressed sequence.

For example, the processing unit is further configured to: perform reordering operation on the zero-embedded sequence, to determine a plurality of zero-embedded subsequences; perform DFT spreading operation on the plurality of zero-embedded subsequences, to determine a plurality of DFT spreading subsequences, perform phase compensating operation on each of the plurality of DFT spreading subsequences, and perform data superposing operation on the DFT spreading subsequences on which the phase compensating operation has been performed, to determine the compressed sequence.

For example, in the case where the electronic equipment is applied to a discrete Fourier transform spread orthogonal frequency division multiplexing (DFT-s-OFDM) system with null cyclic prefix (NCP), the elements in the head sequence and the tail sequence are all zero. In the case where the electronic equipment is applied to a discrete Fourier transform spread orthogonal frequency division multiplexing (DFT-s-OFDM) system with unique words (UW), the header sequence and the trailer sequence are predefined sequences.

According to another aspect of the present disclosure, there is provided an electronic equipment, comprising: an input unit, configured to: determine a sequence to be compressed based on a data sequence; a processing unit, configured to: determine, based on the sequence to be compressed, a compressed sequence by utilizing discrete Fourier transform spreading, and determine, based on the compressed sequence, a sequence to be transmitted by utilizing frequency-domain spectrum shaping (FDSS).

For example, the electronic equipment is applied to a discrete Fourier transform spread orthogonal frequency division multiplexing (DFT-s-OFDM) system with null cyclic prefix (NCP) or a discrete Fourier transform spread orthogonal frequency division multiplexing (DFT-s-OFDM) system with unique words (UW), wherein the input unit is further configured to: determine the sequence to be compressed based on input data sequence, head sequence and tail sequence, wherein the sequence to be compressed has Q elements, and Q is an integer greater than 0; the processing unit is further configured to: determine, based on the sequence to be compressed, a DFT spreading sequence by utilizing DFT spreading, perform at least one of data deleting operation or data superposing operation on the DFT spreading sequence, to determine the compressed sequence, wherein the compressed sequence has M symbols, M is an integer greater than 0, and M is less than Q, and determine, based on the compressed sequence, the sequence to be transmitted by utilizing frequency-domain spectrum shaping (FDSS).

For example, the processing unit is further configured to: add a cyclic prefix sequence to the sequence to be transmitted based on a cyclic prefix indicator, wherein the cyclic prefix indicator is included in RRC signaling, MAC CE signaling, or DCI signaling.

In the examples according to the present disclosure, there is provided a scheme of unified non-orthogonal waveform (uNOW). Optionally, this scheme adds, before DFT operation, a head sequence and a tail sequence to a data sequence to form a sequence to be compressed, and performs, after DFT operation, data deleting operation or data superposing operation to determine a compressed sequence, thereby increasing the performances of PAPR, OOBE and SE of the DFT-s-OFDM waveform while realizing compression of time-domain symbols. Optionally, this scheme also realizes flexible time-domain compression adjustment by performing irregular zero-padding operation on the sequence to be compressed before DFT operation. In addition, the uNOW scheme according to the present disclosure can be integrated with other schemes in the framework of 6G communication systems, thereby increasing compatibility and flexibility.

BRIEF DESCRIPTION OF DRAWINGS

The above and other objectives, features, and advantages of the present disclosure will become more apparent by making more detailed descriptions of the embodiments of the present disclosure in conjunction with the accompanying drawings. The accompanying drawings are used to provide a further understanding of the embodiments of the present disclosure and constitute a part of the specification, and together with the embodiments of the present disclosure, serve to explain the present disclosure, and do not constitute a limitation to the present disclosure. In the accompanying drawings, like reference numerals generally represent like parts or steps.

FIG. 8 is a schematic block diagram illustrating another electronic equipment according to an embodiment of the present disclosure.

FIG. 9 is a flowchart of a method performed by the electronic equipment according to an embodiment of the present disclosure.

FIG. 10 is a flowchart of a method performed by the electronic equipment according to an embodiment of the present disclosure.

FIG. 11 is a schematic diagram of hardware structure of involved electronic equipment according to an embodiment of the present disclosure.

DETAILED DESCRIPTION

Figure 1:
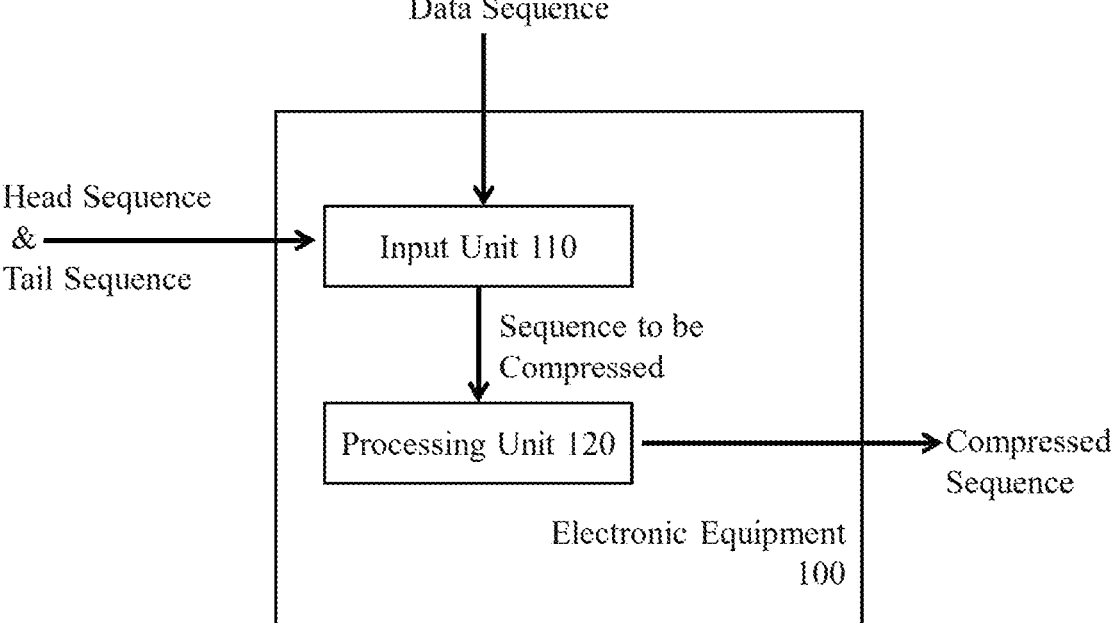
FIG. 1 is a schematic block diagram showing an electronic equipment according to an embodiment of the present disclosure.

In order to make the objectives, technical solutions and advantages of the present disclosure more obvious, exemplary embodiments according to the present disclosure will be described in detail below with reference to the accompanying drawings. In the accompanying drawings, like reference numerals refer to like elements throughout. It should be understood that the embodiments described herein are merely illustrative and should not be construed as limiting the scope of the present disclosure.

The future 6G communication systems propose a higher requirement for each of peak to average power ratio (PAPR), out-of-band emission (OOBE), and spectrum efficiency (SE). Discrete Fourier transform spread orthogonal frequency division multiplexing (DFT-s-OFDM), which is an existing uplink waveform of 5G system, has a lower PAPR and is one of the important candidate waveforms of 6G. At present, multiple improvement schemes of DFT-s-OFDM have been proposed to attempt to boost the above multiple performances.

For example, at present, a null cyclic prefix (NCP) based DFT-s-OFDM scheme has been proposed. The NCP-based DFT-s-OFDM scheme reduces the OOBE and increases the SE by inserting zero sequences in replacement of traditional cyclic prefixes before performing discrete Fourier transform (DFT) on the data. Similarly, at present, a unique word (UW) based DFT-s-OFDM scheme has been proposed. The UW-based DFT-s-OFDM scheme reduces the OOBE and increases the SE by inserting known sequences in replacement of traditional cyclic prefixes before performing discrete Fourier transform (DFT) on the data.

For example, at present, a frequency-domain spectral shaping (FDSS) based DFT-s-OFDM scheme has further been proposed. This scheme adjusts the correlation and distribution of time-domain signals by shaping frequency-domain signals, thereby reducing the PAPR. In addition, at present, a faster-than-Nyquist (FTN) modulation-based DFT-s-OFDM scheme, which is also referred to as a non-orthogonal waveform framework (NOW) scheme, has further been proposed. This scheme realizes compression of time-domain sampled signals by performing further FTN modulating operation on DFT-s-OFDM, thereby reducing the PAPR while boosting the SE. However, while the FTN modulation-based DFT-s-OFDM scheme can realize compression of sampled signals, it cannot be compatible with the above NCP/UW-based DFT-s-OFDM scheme, and cannot be realized based on a unified framework.

However, none of the above schemes can increase the performances of PAPR, OOBE, and SE of the DFT-s-OFDM waveform at the same time, and it is also difficult for the current NOW scheme to be integrated with the framework of the NCP/UW-based DFT-s-OFDM scheme, as each of the compatibility, robustness, and flexibility are to be further enhanced.

To this regard, in an example according to the present disclosure, there is provided a scheme of a unified non-Orthogonal waveform (uNOW). Optionally, this scheme adds, before DFT operation, a head sequence and a tail sequence to a data sequence to form a sequence to be compressed, and performs, after DFT operation, data deleting operation or data superposing operation to determine a compressed sequence, thereby increasing the performances of PAPR, OOBE and SE of the DFT-s-OFDM waveform while realizing compression of time-domain symbols. Optionally, this scheme also realizes flexible time-domain compression adjustment by performing irregular zero-padding operations on the sequence to be compressed before DFT operation. In addition, the uNOW scheme according to the present disclosure can be integrated with other schemes in the framework of 6G communication systems, thereby increasing compatibility and flexibility.

Hereinafter, an electronic equipment 100 according to an embodiment of the present disclosure will be illustrated with reference to FIG. 1. FIG. 1 is a schematic block diagram showing an electronic equipment 100 according to an embodiment of the present disclosure. The electronic equipment 100 can perform signal processing under the NCP or UW framework to determine the compressed sequence involved in the above uNOW scheme.

As shown in FIG. 1, an electronic equipment 100 according to an embodiment of the present disclosure may be used as a part of a transmitting end in a communication system. For example, the electronic equipment 100 may be a part of a base station or a user terminal. Hereinafter, the embodiments of the present disclosure will be described by taking a 5G evolution communication network and a 6G communication network as examples, but it should be recognized that the following description may also be applicable to other types of wireless communication networks.

As shown in FIG. 1, the electronic equipment 100 may include an input unit 110 and a processing unit 120. In addition to the input unit 110 and the processing unit 120, the electronic equipment 100 may further include other components (e.g., a transmitting unit for transmitting a compressed sequence, such as an antenna, etc.) which, however, are irrelevant to the disclosure of the embodiments of the present disclosure, thus the illustrations and descriptions thereof are omitted here.

As shown in FIG. 1, the input unit 110 may be configured to determine a sequence to be compressed based on a data sequence, a header sequence and a trailer sequence, wherein the sequence to be compressed has Q elements, and Q is an integer greater than 0. The processing unit 120 may be configured to determine, based on the sequence to be compressed, a DFT spreading sequence by utilizing DFT spreading, and perform at least one of data deleting operation or data superposing operation on the DFT spreading sequence to determine a compressed sequence, wherein the compressed sequence has M symbols, M is an integer greater than 0, and M is less than Q.

For example, each of the elements in the data sequence may be a time-domain symbol to be transmitted. For example, in the case where the electronic equipment 100 is applied to a discrete Fourier transform spread orthogonal frequency division multiplexing (DFT-s-OFDM) system with null cyclic prefix (NCP), the elements in the header sequence and the trailer sequence are all zero. For another example, in the case where the electronic equipment 100 is applied to a discrete Fourier transform spread orthogonal frequency division multiplexing (DFT-s-OFDM) system with unique words (UW), the header sequence and the trailer sequence are predefined sequences. That is, the elements in the head sequence and the tail sequence are predefined elements.

Flexible time-domain compression adjustment is realized by spreading the head sequence and the tail sequence of the time-domain symbol to be transmitted before DFT spreading operation and performing at least one of data deleting operation or data superposing operation after DFT spreading operation. At the same time, this scheme further realizes DFT orthogonal multiplexing of the head sequence and the tail sequence and DFT non-orthogonal multiplexing of the data sequence, so that the uNOW scheme according to the present disclosure can be integrated with other schemes (e.g., NCP or UW scheme) in the framework of 6G communication systems, thereby increasing compatibility and flexibility.

In addition, the processing unit 120 may realize flexible time-domain compression by using different compression factors. For example, the processing unit 120 may be further configured to compress the head sequence and the tail sequence in the sequence to be compressed by a first compression factor, and compress the data sequence in the sequence to be compressed by a second compression factor. Among other things, the first compression factor indicates a ratio of the data amount of the head sequence and the tail sequence in the sequence to be compressed to the data amount of the head sequence and the tail sequence in the compressed sequence, and the second compression factor indicates a ratio of the data amount of the data sequence in the sequence to be compressed to the data amount of the data sequence in the compressed sequence.

Optionally, the first compression factor may be the same as or different from the second compression factor. In the following, the cases where the first compression factor and the second compression factor are the same and different are discussed, respectively. It is worth noting that in the case where the first compression factor and the second compression factor are the same, the first compression factor and the second compression factor may be the same compression factor. That is, in this case, the electronic equipment 100 may be provided with only a single compression factor to realize compression of the sequence to be compressed.

For example, in the case where the first compression factor and the second compression factor are the same (or the first compression factor and the second compression factor are the same compression factor), the sequence to be compressed and the compressed sequence can be shown as follows. It is assumed that the first compression factor is $\alpha_1$ and the second compression factor is $\alpha_2$. It is further assumed that the first compression factor and the second compression factor are the same and both equal to $\alpha$, that is $\alpha_1=\alpha_2=\alpha$. Or, both the first compression factor and the second compression factor are the compression factor $\alpha$.

An example of header sequence is $u=[u_0 \ldots u_1 \ldots u_{N_H-1}]^T$, where $0 \leq i \leq N_H-1$. An example of tail sequence is $v=[v_0 \ldots v_i \ldots v_{N_T-1}]^T$, where $0 \leq i \leq N_T-1$. An example of data sequence is $d=[d_0 \ldots d_f \ldots d_{Q_d-1}]^T$, where $0 \leq i \leq Q_d-1$. After being processed by the input unit 110, the sequence to be compressed $s=[s_0 \ldots s_i \ldots s_{Q-1}]^T$ ($0 \leq i \leq Q-1$) can be obtained. Among other things, the number of elements (amount of data) of the sequence to be compressed is $=Q_d+N_H+N_T$.

A compressed sequence with M symbols is obtained by processing the sequence to be compressed s by the processing unit 120, where $M=Q_{d0}+N_{H0}+N_{T0}$, in which $$N_H = \left\lfloor \frac{N_{H0}}{\alpha} \right\rfloor, N_T = \left\lfloor \frac{N_{T0}}{\alpha} \right\rfloor, Q_d = \left\lfloor \frac{Q_{d0}}{\alpha} \right\rfloor.$$

Afterwards, the process of acquiring the compressed sequence will be further illustrated with reference to FIGS. 2 to 4, which will not be detailed here.

For example, in the case where the first compression factor and the second compression factor are different, examples of the sequence to be compressed and the compressed sequence can be shown as follows. It is assumed that the first compression factor is $\alpha_1$ and the second compression factor is $\alpha_2$. It is further assumed that the first compression factor is different from the second compression factor, that is $\alpha_1 * \alpha_2$. Optionally, in some examples, $\alpha_1 > \alpha_2$.

In the above case, an example of header sequence is $u=[u_0 \ldots u_i \ldots u_{N_H-1}]^T$, where $0 \leq i \leq N_H-1$. An example of tail sequence is $v=[v_0 \ldots v_i \ldots v_{N_T-1}]^T$, where $0 \leq i \leq N_T-1$. An example of the data sequence is $d=[d_0 \ldots d_1 \ldots d_{Q_d-1}]^T$, where $0 \leq i \leq Q_d-1$. After being processed by the input unit 110, the sequence to be compressed $s=[s_0 \ldots s_i \ldots s_{Q-1}]^T$ ($0 \leq i \leq Q-1$) can be obtained. Among other things, the number of elements (amount of data) of the sequence to be compressed is $=Q_d+N_H+N_T$. A compressed sequence with M symbols is obtained by processing the sequence to be compressed s by the processing unit 120, where $M=Q_{d0}+N_{H0}+N_{T0}$, in which $$N_H = \left\lfloor \frac{N_{H0}}{\alpha_1} \right\rfloor, N_T = \left\lfloor \frac{N_{T0}}{\alpha_1} \right\rfloor, Q_d = \left\lfloor \frac{Q_{d0}}{\alpha_2} \right\rfloor.$$

Afterwards, the process of acquiring the compressed sequence will be further illustrated with reference to FIGS. 5 to 7, which will not be detailed here.

Therefore, the disclosure increases the performances of PAPR, OOBE, and SE of the DFT-s-OFDM waveforms while realizing compression of time-domain symbols. Optionally, this scheme also realizes flexible time-domain compression adjustment by performing irregular zero-padding operation on the sequence to be compressed before DFT operation. In addition, the uNOW scheme according to the present disclosure can be integrated with other schemes in the framework of 6G communication systems, thereby increasing the compatibility and flexibility. The processing unit 120 can further realize flexible time-domain compression adjustment by using different compression factors. The operations performed by the processing unit 120 are further described below with reference to FIGS. 2 to 7, and it should be understood by those skilled in the art that the present disclosure is not limited thereto.

With the electronic equipment according to the disclosed embodiments, more data can be transmitted using the same time as the current specific transmission time. As an example, the current specific transmission time can be in the unit of the transmission time of a single OFDM symbol. It could be understood by those skilled in the art that the present disclosure is not limited thereto. Of course, for a specific amount of data, the electronic equipment according to the disclosed embodiments can also use less time than the currently required transmission time for transmission.

Hereinafter, the operations performed by the input unit 110 and the processing unit 120 in the case where the first compression factor is equal to the second compression factor, that is, $\alpha_1 = \alpha_2 = \alpha$ will be illustrated with reference to FIGS. 2 to 4.

Figure 2:
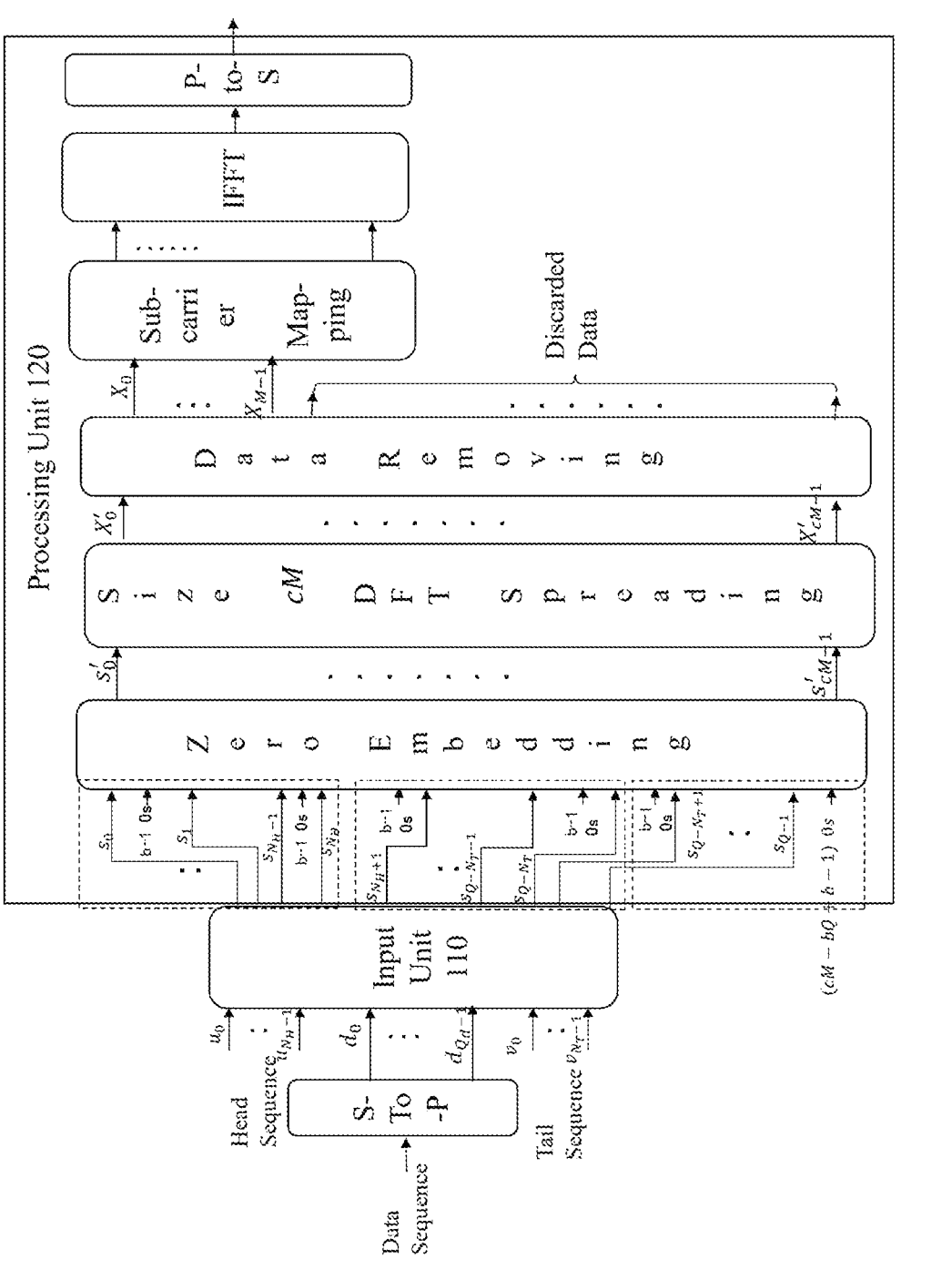
FIG. 2 is a schematic diagram showing signal processing performed by the electronic equipment under the NCP or UW framework according to an embodiment of the present disclosure.

FIG. 2 is a schematic diagram showing signal processing performed by the electronic equipment 100 under the NCP or UW framework according to an embodiment of the present disclosure.

Referring to FIG. 2, the processing unit 120 is further configured to perform zero-embedding operation, size cM DFT spreading operation and data removing operation on the sequence to be compressed. For example, processing unit 120 may perform zero-padding operation on the sequence to be compressed according to at least a part of the first compression factor or the second compression factor, to determine a zero-embedded sequence. Then, the processing unit 120 performs DFT spreading operation on the zero-embedded sequence, to determine a DFT spreading sequence. Next, processing unit 120 performs data removing operation on the DFT spreading sequence (i.e., discards part of the data in the DFT spreading sequence), to determine the compressed sequence.

As described above, it is assumed that the header sequence is $u=[u_0 \ldots u_i \ldots u_{N_H-1}]^T$, where $0 \leq i \leq N_H-1$. An example of tail sequence is $v=[v_0 \ldots v_i \ldots v_{N_T-1}]^T$, where $0 \leq i \leq N_T-1$. An example of data sequence is $d=[d_0 \ldots d_i \ldots d_{Q_d-1}]^T$, where $0 \leq i \leq Q_d-1$. After being processed by the input unit 110, the sequence to be compressed $s=[s_0 \ldots s_i \ldots s_{Q-1}]^T$ ($0 \leq i \leq Q-1$) can be obtained. Among other things, the number of elements (amount of data) of the sequence to be compressed is $=Q_d+N_H+N_T$.

As an example, each of the elements $s_i$ in the sequence to be compressed $s=[s_0 \ldots s_i \ldots s_{Q-1}]^T$ can be represented by formula (1).

$$s_i = \begin{cases} u_i, & 0 \leq i \leq N_H - 1 \\ d_{i-N_H}, & N_H \leq i \leq Q - N_T - 1 \\ v_{i-N_H-Q_d}, & Q - N_T \leq i \leq Q - 1 \end{cases} \tag{1}$$

Since the size cM DFT spreading operation converts cM time-domain symbols into cM frequency-domain symbols, it is necessary to generate a zero-embedded sequence with a data amount of cM, where $M=Q_{d0}+N_{H0}+N_{T0}$, in which $\alpha_1=\alpha_2=\alpha$, $$N_H = \left\lfloor \frac{N_{H0}}{\alpha} \right\rfloor, N_T = \left\lfloor \frac{N_{T0}}{\alpha} \right\rfloor, Q_d = \left\lfloor \frac{Q_{d0}}{\alpha} \right\rfloor.$$

It is further assumed that $$\alpha = \frac{b}{c},$$

$b \leq c$, then the zero-embedded sequence $$s' = [s'_0 \ldots s'_i \ldots s'_{cM-1}]^T$$

($0 \leq i \leq cM-1$) can be obtained by performing zero-padding operation on the sequence to be compressed s according to $\alpha$. Among other things, the ith element $s_i'$ in the zero-embedded sequence s' is either zero or an element in the sequence to be compressed $s=[s_0 \ldots s_i \ldots s_{Q-1}]^T$. As shown in FIG. 2, a total of (cM−Q) zeros are padded. Since the above expression involves rounding down operation, in some examples, (cM−bQ+b−1) zeros can be padded after the last element $s_{Q-1}$ in the sequence to be compressed s. For example, the ith element $s_i'$ in the zero-embedded sequence s' can be shown by formula (2).

$$s_i' = \begin{cases} s_{i/b}, & i \in \{0, b, \ldots, b(Q-1)\} \\ 0, & i \notin \{0, b, \ldots, b(Q-1)\} \end{cases} \tag{2}$$

By performing size cM DFT spreading operation on the above zero-embedded sequence $$s' = [s'_0 \ \ldots \ s'_i \ \ldots \ s'_{cM-1}]^T,$$

a DFT spreading sequence $$X' = [X'_0 \ \ldots \ X'_i \ \ldots \ X'_{cM-1}]^T$$

($0 \leq i \leq cM-1$) can be obtained. Among other things, the relationship between the DFT spreading sequence X' and the zero-embedded sequence s' can be shown by formula (3).

$$X' = F^{cM} s' \qquad (3)$$

where $F^{cM}$ is a size cM DFT matrix. A compressed sequence $X=[X_0 \ldots X_i \ldots X_{M-1}]^T$ ($0 \leq i \leq M-1$) can be obtained after performing data removing operation on the above DFT spreading sequence X'. Among other things, for the ith element in the compressed sequence X, it can be calculated by formula (3) as follows.

$$X_i = X'_i = \frac{1}{\sqrt{M}} \sum_{m=0}^{cM-1} s'_m e^{-\frac{j2\pi im}{cM}} = \frac{1}{\sqrt{M}} \sum_{m=0}^{Q-1} s_m e^{-\frac{j2\pi i\left(\frac{b}{c}m\right)}{M}} \qquad (4)$$

Therefore, processing unit 120 obtains the compressed sequence $X=[X_0 \ldots X_i \ldots X_{M-1}]^T$ with M symbols based on the sequence to be compressed $s=[s_0 \ldots s_i \ldots s_{Q-1}]^T$ with Q elements. Afterwards, processing unit 120 may further generate a sequence to be transmitted based on the compressed sequence. Compared with the currently provided scheme, the electronic equipment according to the embodiment of the present disclosure can use the same time as the current specific transmission time to transmit more data.

In addition, the processing unit 120 may further process the compressed sequence. For example, subcarrier mapping operation, IFFT operation, parallel-to-serial operation, etc. are sequentially performed on the compressed sequence $X=[X_0 \ldots X_1 \ldots X_{M-1}]^T$, to generate the sequence to be transmitted. In some examples, the processing unit 120 may also perform further data removing operation after the IFFT operation and before the parallel-to-serial operation. Therefore, the transmission of a specific amount of data using less time than the transmission time currently required is realized.

In the above process, the processing unit 120 simultaneously realizes DFT orthogonal multiplexing or DFT non-orthogonal multiplexing of the data sequence, the head sequence, and the tail sequence by utilizing flexible zero-embedding operation and single size cM DFT matrix, so that the uNOW scheme according to the present disclosure can be integrated with other schemes (e.g., NCP and UW scheme) in the framework of the 6G communication systems, thereby increasing the compatibility and flexibility.

Figure 3:
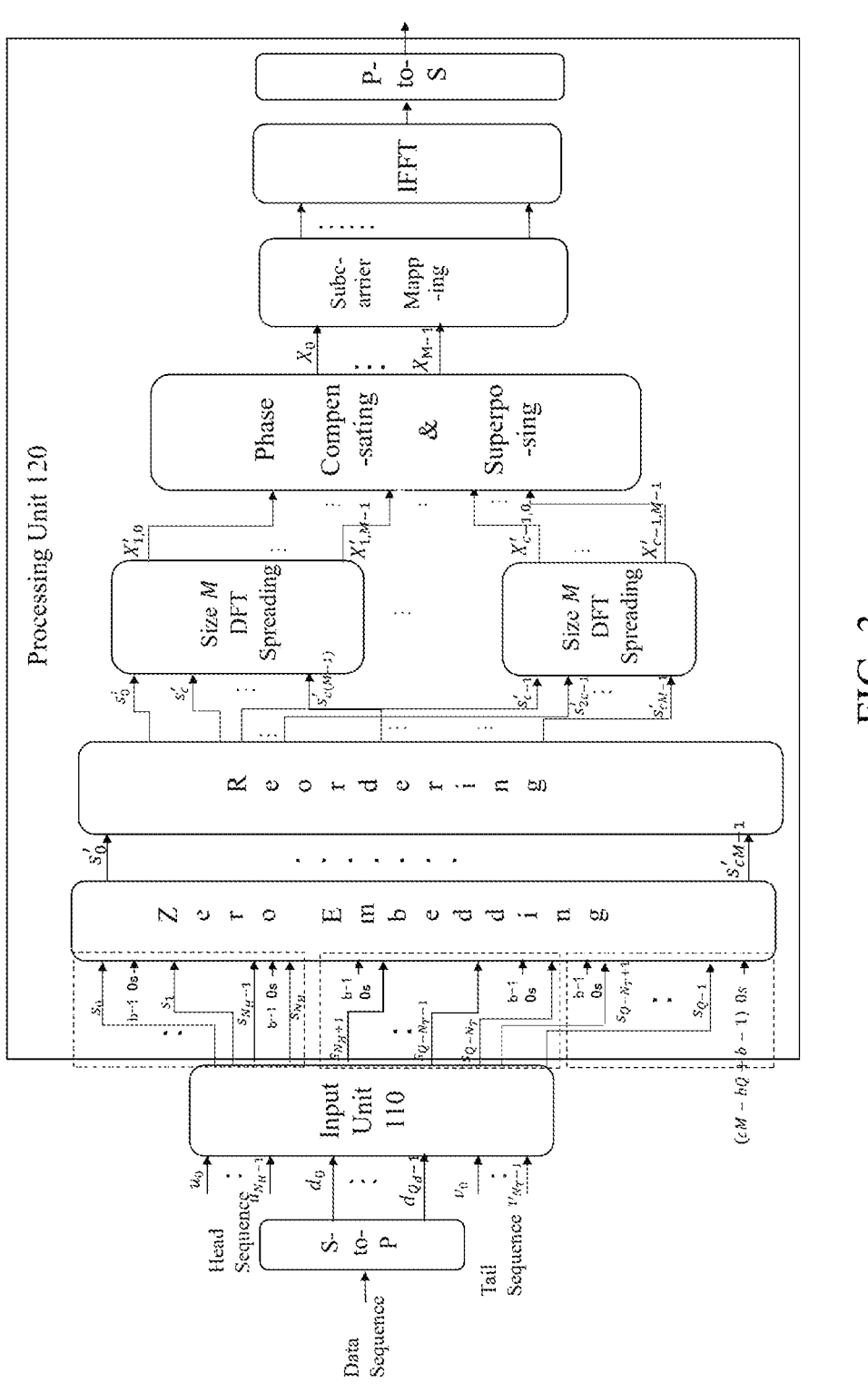
FIG. 3 is a schematic diagram showing signal processing performed by the electronic equipment under the NCP or UW framework according to an embodiment of the present disclosure.

FIG. 3 is another schematic diagram showing signal processing performed the electronic equipment 100 under the NCP or UW framework according to an embodiment of the present disclosure.

Referring to FIG. 3, the processing unit 120 is further configured to use c size M DFT matrixes to realize time-domain compression adjustment. For example, the processing unit 120 may perform zero-embedding operation, reordering operation, size M DFT spreading operation, phase compensating operation and data superposing operation on the sequence to be compressed. Among other things, the zero-embedding operation is the same as that in FIG. 2, which will not be detailed here. Next, the processing unit 120 may perform a reordering operation on the zero-embedded sequence, to determine a plurality of zero-embedded subsequences. Then, the processing unit 120 may perform DFT spreading operation on the plurality of zero-embedded subsequences, to determine a plurality of DFT spreading subsequences. Then, processing unit 120 performs a phase compensating operation on each of the plurality of DFT spreading subsequences, and performs data superposing operation on the DFT spreading subsequences on which the phase compensating operation has been performed, to determine the compressed sequence.

The zero-embedding operation in FIG. 3 is the same as that in FIG. 2, that is, reordering operation may be performed on the zero-embedded sequence $$s' = [s'_0 \ \ldots \ s'_i \ \ldots \ s'_{cM-1}]^T,$$

to determine c zero-embedded subsequences with M elements. For the kth zero-embedded sequence (where k=0, 1, . . . , c−1) of the c zero-embedded subsequences, it can be shown as $$\bar{s}'_k = \left[s'_{k+c} \ \ldots \ s'_{k+ic} \ \ldots \ s'_{k+(M-1)c}\right]^T,$$

$0 \leq i \leq M-1$.

By performing size M DFT spreading operation on the above c zero-embedded subsequences respectively, c DFT spreading subsequences can be obtained. For the kth DFT spreading subsequence (where k=0, 1, . . . , c−1) of the c DFT spreading subsequences, it can be shown as $$X'_k = \left[X'_{k,0} \ \ldots \ X'_{k,i} \ \ldots \ X'_{k,M-1}\right]^T,$$

$0 \leq i \leq M-1$. Among other things, the relationship between the DFT spreading subsequence $X_k'$ and the zero-embedded subsequence $\bar{s}_k'$ can be shown by formula (5).

$$X'_k = F^M s'_k \qquad (5)$$

where $F^M$ is a size M DFT matrix. The compressed sequence $X=[X_0 \ \ldots \ X_i \ \ldots \ X_{M-1}]^T$ ($0 \leq i \leq M-1$) can be obtained by performing phase compensating operation and data superposing operation on the above c DFT spreading subsequences X'. Among other things, the ith element in the compressed sequence X can be calculated by formula (6) as follows.

$$X_i = \sum_{k=0}^{c-1} e^{-\frac{j2\pi ki}{cM}} X'_{k,i} = \qquad (6)$$

US 12,615,173 B2

11

-continued $$\frac{1}{\sqrt{M}}\sum_{k=0}^{c-1}e^{-\frac{j2\pi ki}{cM}}\sum_{m=0}^{M-1}s'_{k+mc}e^{-\frac{j2\pi im}{M}} = \frac{1}{\sqrt{M}}\sum_{m=0}^{Q-1}s_m e^{-\frac{j2\pi i\left(\frac{b}{c}m\right)}{M}}$$

Therefore, processing unit 120 obtains the compressed sequence X=[X_0 ... X_i ... X_{M-1}]^T with M symbols based on the sequence to be compressed s=[s_0 ... s_i ... s_{Q-1}]^T with Q elements. Afterward, processing unit 120 may further generate a sequence to be transmitted based on the compressed sequence. Compared with the currently provided scheme, the electronic equipment 100 according to the embodiment of the present disclosure can use the same time as the current specific transmission time to transmit more data.

In addition, processing unit 120 may further process the compressed sequence. For example, subcarrier mapping operation, IFFT operation, parallel-to-serial operation, etc. are sequentially performed on the compressed sequence X=[X_0 ... X_i ... X_{M-1}]^T, to generate the sequence to be transmitted. In some examples, processing unit 120 may also perform further data removing operation after the IFFT operation and before the parallel-to-serial operation. Therefore, the transmission of a specific amount of data using less time than the transmission time currently required is realized.

In the above process, processing unit 120 simultaneously realizes DFT orthogonal multiplexing or DFT non-orthogonal multiplexing of the data sequence, the head sequence, and the tail sequence by utilizing flexible zero-embedding operation and c size M DFT matrixes, so that the uNOW scheme according to the present disclosure can be integrated with other schemes (e.g., NCP and UW scheme) in the framework of 6G communication systems, thereby increasing the compatibility and flexibility.

Figure 4:
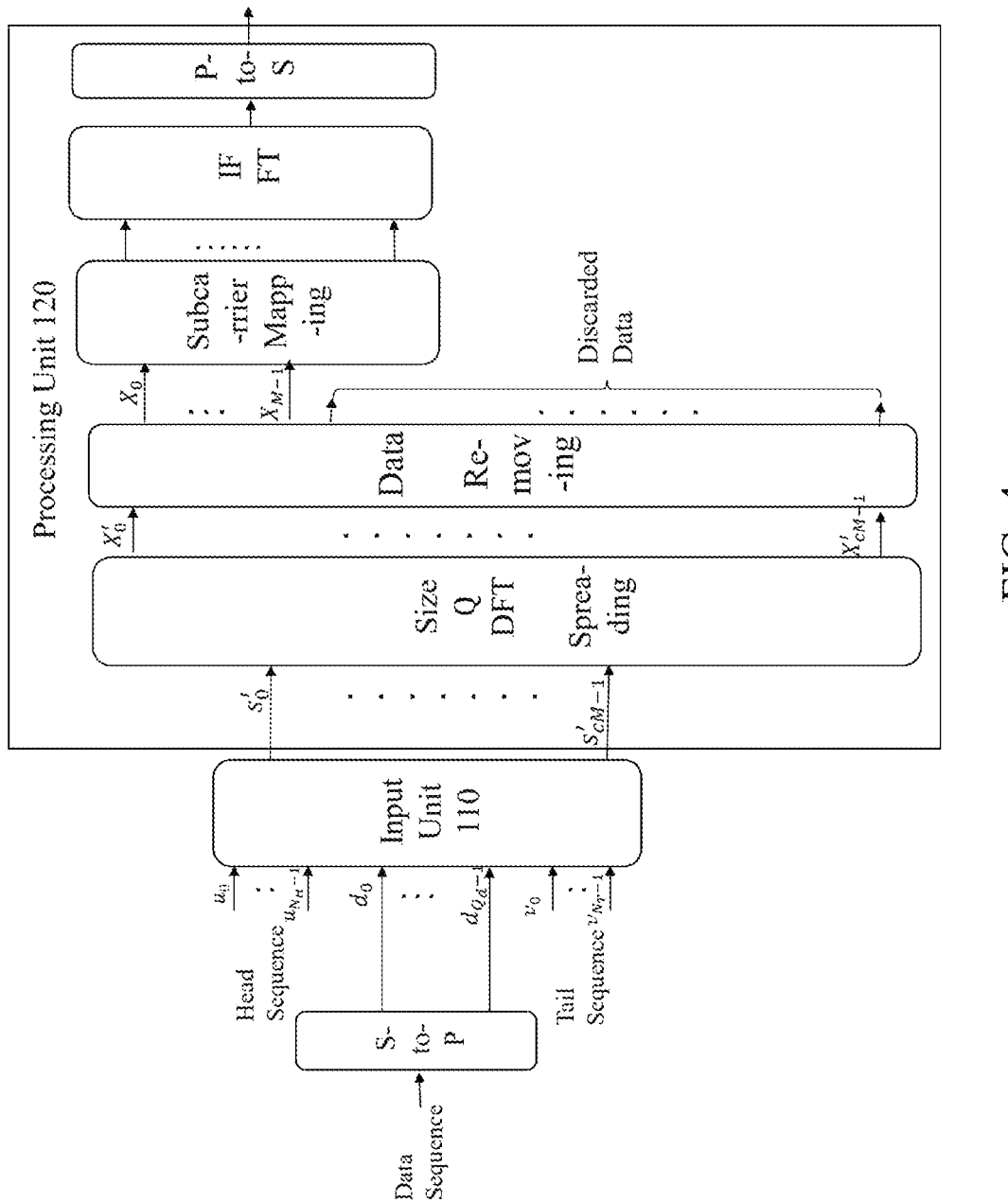
FIG. 4 is a schematic diagram showing signal processing performed by the electronic equipment under the NCP or UW framework according to an embodiment of the present disclosure.

FIG. 4 is another schematic diagram showing signal processing performed by the electronic equipment 100 under the NCP or UW framework according to an embodiment of the present disclosure.

Referring to FIG. 4, processing unit 120 may be further configured to realize time-domain compression adjustment using a size Q DFT matrix. For example, the processing unit 120 may perform size Q DFT spreading operation and data removing operation on the sequence to be compressed. For example, the processing unit 120 may perform size Q DFT spreading operation on the sequence to be compressed, to determine a DFT spreading sequence with Q elements. Then, processing unit 120 performs data removing operation on the DFT spreading sequence, to determine the compressed sequence.

As described above, after being processed by the input unit 110, the sequence to be compressed s=[s_0 ... s_i ... s_{Q-1}]^T (0≤i≤Q-1) can be obtained. After performing size Q DFT spreading operation on the sequence to be compressed s=[s_0 ... s_i ... s_{Q-1}]^T, the DFT spreading sequence $$X' = \left[X'_0 ... X'_i ... X'_{Q-1}\right]^T$$

(0≤i≤Q-1) can be obtained. Among other things, the relationship between the DFT spreading sequence X' and the sequence to be compressed s can be shown by formula (7).

$$X' = F^Q s \qquad (7)$$

12 where F^Q is a size Q DFT matrix. The compressed sequence X=[X_0 ... X_i ... X_{M-1}]^T (0≤i≤M-1) can be obtained after performing data removing operation on the above DFT spreading sequence X'. Among other things, the ith element in the compressed sequence X can be calculated by formula (8) as follows.

$$X_i = X'_i = \frac{1}{\sqrt{M}}\sum_{m=0}^{Q-1}s_m e^{-\frac{j2\pi im}{Q}} = \qquad (8)$$

$$\frac{1}{\sqrt{M}}\sum_{m=0}^{Q-1}s_m e^{-\frac{j2\pi im}{M/\alpha}} = \frac{1}{\sqrt{M}}\sum_{m=0}^{Q-1}s_m e^{-\frac{j2\pi i\left(\frac{b}{c}m\right)}{M}}$$

Therefore, processing unit 120 obtains the compressed sequence X=[X_0 ... X_i ... X_{M-1}]^T with M symbols based on the sequence to be compressed s=[s_0 ... s_i ... s_{Q-1}]^T with Q elements. Afterward, processing unit 120 may further generate a sequence to be transmitted based on the compressed sequence. Compared with the currently provided scheme, the electronic equipment according to the embodiment of the present disclosure can use the same time as the current specific transmission time to transmit more data.

In the above process, processing unit 120 simultaneously realizes DFT orthogonal multiplexing or DFT non-orthogonal multiplexing of the data sequence, the head sequence, and the tail sequence by utilizing single size Q DFT matrix and data removing operation, so that the uNOW scheme according to the present disclosure can be integrated with other schemes (e.g., NCP and UW scheme) in the framework of the 6G communication systems, thereby increasing the compatibility and flexibility.

Hereinafter, the operations performed by input unit 110 and processing unit 120 in the case where the first compression factor is not equal to the second compression factor (i.e., α_1≠α_2) will be illustrated with reference to FIGS. 5 to 7.

Figure 5:
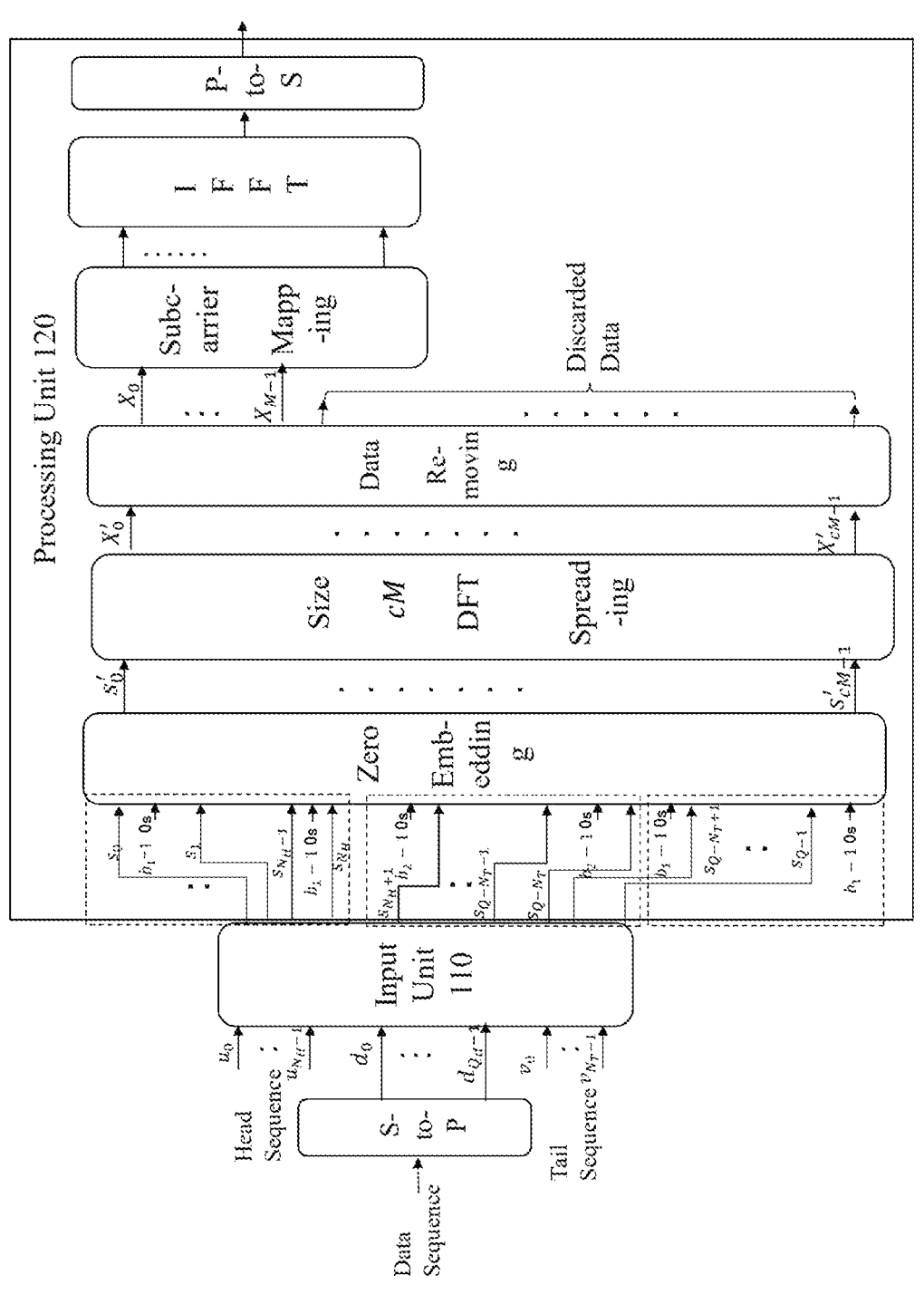
FIG. 5 is a schematic diagram showing signal processing performed by the electronic equipment under the NCP or UW framework according to an embodiment of the present disclosure.

FIG. 5 is a schematic diagram showing signal processing performed by the electronic equipment 100 under the NCP or UW framework according to an embodiment of the present disclosure.

Referring to FIG. 5, the processing unit 120 is further configured to perform zero-embedding operation, size cM DFT spreading operation and data removing operation on the sequence to be compressed. For example, the processing unit 120 may perform zero-padding operation on the sequence to be compressed according to at least the first compression factor and the second compression factor, to determine a zero-embedded sequence. Then, processing unit 120 performs DFT spreading operation on the zero-embedded sequence, to determine a DFT spreading sequence. Next, processing unit 120 performs data removing operation on the DFT spreading sequence, to determine the compressed sequence.

As described above, it is assumed that the header sequence is u=[u_0 ... u_i ... u_{N_H-1}]^T, where 0≤i×N_H-1. An example of a tail sequence is v=[v_0 ... v_i ... v_{N_T-1}]^T, where 0≤i≤N_T-1. An example of a data sequence is d=[d_0 ... d_i ... d_{Q_d-1}]^T, where 0≤i≤Q_d-1. After being processed by the input unit 110, the sequence to be compressed s=[s_0 ... s_i ... s_{Q-1}]^T (0≤i≤Q-1) can be obtained. Among other things, the number of elements (amount of data) of the sequence to be compressed is =Q_d+N_H+N_T.

Since the size cM DFT spreading operation converts cM time-domain symbols into cM frequency-domain symbols, it is necessary to generate a zero-embedded sequence with a data amount of cM, where $M=Q_{d0}+N_{H0}+N_{T0}$, in which $$N_H = \left\lfloor \frac{N_{H0}}{\alpha_1} \right\rfloor, \, N_T = \left\lfloor \frac{N_{T0}}{\alpha_1} \right\rfloor, \, Q_d = \left\lfloor \frac{Q_{d0}}{\alpha_2} \right\rfloor.$$

It is further assumed that $$\alpha_1 = \frac{b_1}{c}, \, \alpha_2 = \frac{b_2}{c}, \, b_1 \le c, \, b_2 \le c.$$

Then by performing a zero-padding operation on the sequence s to be compressed according to the first compression factor $\alpha_1$ and the second compression factor $\alpha_2$, a zero-embedded sequence $$s' = [s_0' \, \dots \, s_i' \, \dots \, s_{cM-1}']^T$$

($0 \le i \le cM-1$) can be obtained. Among other things, the ith element in the zero-embedded sequence $s_i'$ is either zero or an element in the sequence to be compressed $s=[s_0 \, \dots \, s_i \, \dots \, s_{Q-1}]^T$. For example, the ith element $s_i'$ in the zero-embedded sequence $s_i'$ can be shown by formula (9).

$$s_i' = \begin{cases} s_{i/b_1}, & i \in \{0, b_1, \dots, b_1(N_H-1)\} \\ s_{(i-b_1 N_H)/b_2}, & i \in \{b_1 N_H, b_1 N_H + b_2, \dots, b_1 N_H + b_2(Q_d-1)\} \\ s_{(i-b_1 N_H - b_2 Q_d)/b_1}, & i \in \{b_1 N_H + b_2 Q_d, b_1 N_H + b_2 Q_d + b_1, \dots, b_1 N_H + b_2 Q_d + b_1(N_T-1)\} \\ 0, & \text{otherwise} \end{cases} \quad (9)$$

By performing size cM DFT spreading operation on the above zero-embedded sequence $$s' = [s_0' \, \dots \, s_i' \, \dots \, s_{cM-1}']^T,$$

a DFT spreading sequence $$X' = [X_0' \, \dots \, X_i' \, \dots \, X_{cM-1}']^T$$

($0 \le i \le cM-1$) can be obtained. Among other things, the relationship between the DFT spreading sequence X' and the zero-embedded sequence s' can be shown by formula (10).

$$X' = F^{cM} s' \quad (10)$$

where $F^{cM}$ is a size cM DFT matrix. The compressed sequence $X=[X_0 \, \dots \, X_i \, \dots \, X_{M-1}]^T$ ($0 \le i \le M-1$) can be obtained by performing data removing operation on the above DFT spreading sequence X'. Among other things, the ith element in the compressed sequence X can be calculated by formula (11) as follows.

$$X_i = X_i' = \frac{1}{\sqrt{M}} \sum_{m=0}^{cM-1} s_m' e^{-\frac{j2\pi im}{cM}} \quad (11)$$

Therefore, the processing unit 120 obtains a compressed sequence $X=[X_0 \, \dots \, X_i \, \dots \, X_{M-1}]^T$ with M symbols based on the sequence to be compressed $s=[s_0 \, \dots \, s_i \, \dots \, s_{Q-1}]^T$ with Q elements. Afterward, processing unit 120 may further generate a sequence to be transmitted based on the compressed sequence. Compared with the currently provided scheme, the electronic equipment according to the embodiment of the present disclosure can use the same time as the current specific transmission time to transmit more data.

In addition, the processing unit 120 may further process the compressed sequence. For example, subcarrier mapping operation, IFFT operation, parallel-to-serial operation, etc. are sequentially performed on the compressed sequence $X=[X_0 \, \dots \, X_i \, \dots \, X_{M-1}]^T$, to generate the sequence to be transmitted. In some examples, processing unit 120 may also perform further data removing operation (not shown) after the IFFT operation and before the parallel-to-serial operation. Therefore, the transmission of a specific amount of data using less time than the transmission time currently required is realized.

In the above process, the processing unit 120 simultaneously realizes DFT orthogonal multiplexing of the head sequence and the tail sequence and DFT non-orthogonal multiplexing of the data sequence by utilizing flexible zero-embedding operation and single size cM DFT matrix, so that the uNOW scheme according to the present disclosure can be integrated with other schemes (e.g., NCP and UW scheme) in the framework of the 6G communication systems, thereby increasing the compatibility and flexibility. Moreover, the compression factor corresponding to the head sequence and the tail sequence is different from that corresponding to the data sequence, so that it can be realized, for example, only the data sequence is compressed without compressing the head sequence and the tail sequence.

Figure 6:
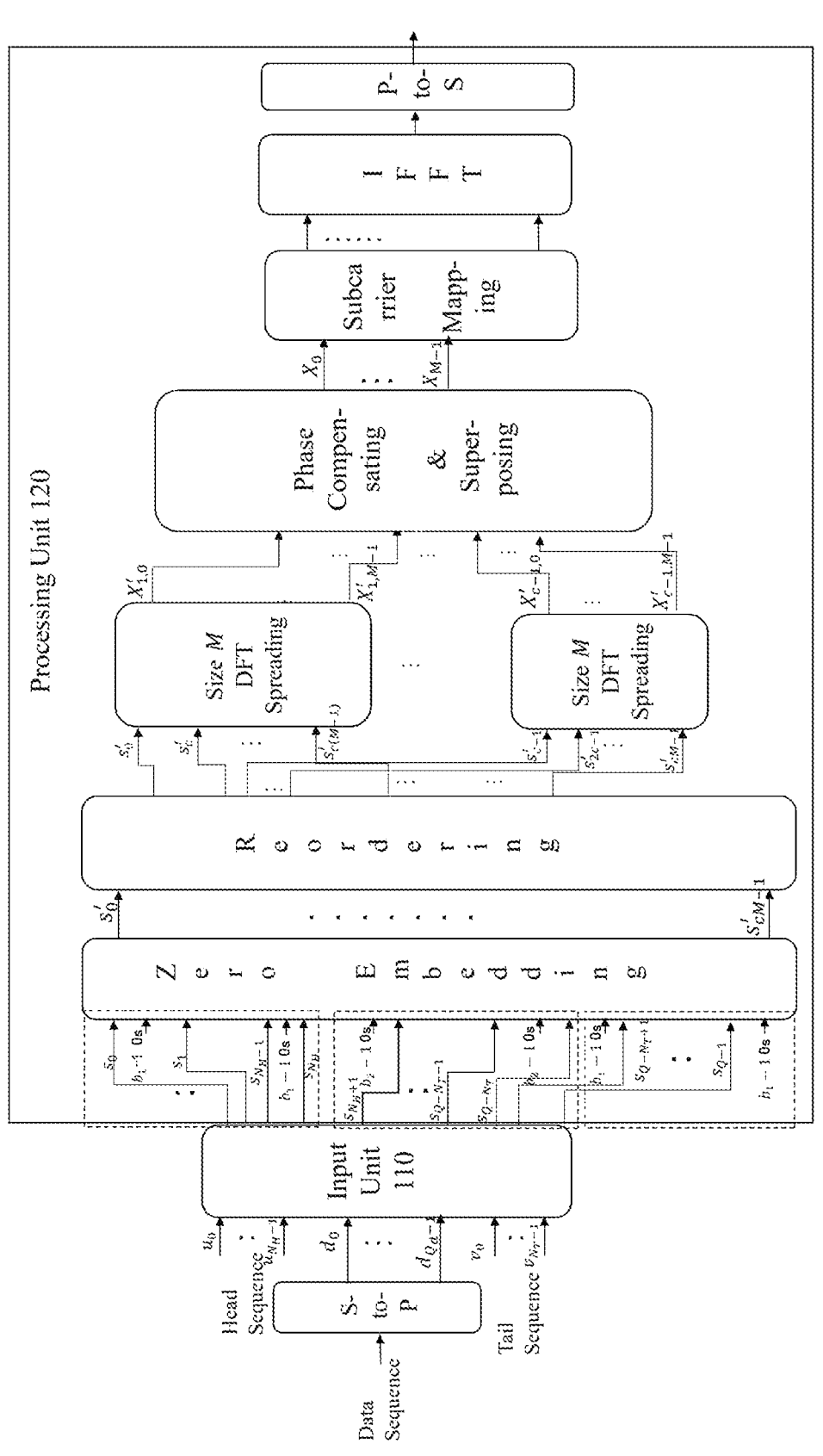
FIG. 6 is a schematic diagram showing signal processing performed by the electronic equipment under the NCP or UW framework according to an embodiment of the present disclosure.

FIG. 6 is another schematic diagram showing signal processing performed by the electronic equipment 100 under the NCP or UW framework according to the embodiment of the present disclosure.

Referring to FIG. 6, the processing unit 120 is further configured to use c size DFT matrixes to realize time-domain compression adjustment. For example, the processing unit 120 may perform zero-embedding operation, reordering operation, size M DFT spreading operation, phase compensating operation and data superposing operation on the sequence to be compressed. Among other things, the zero-embedding operation is the same as the zero-embedding operation in FIG. 5. Next, the processing unit 120 may perform a reordering operation on the zero-embedded sequence, to determine a plurality of zero-embedded subsequences. The reordering operation, the size M DFT spreading operation, the phase compensating operation, and the data superposing operation are all the same as the reordering operation in FIG. 3.

The zero-embedding operation in FIG. 6 is the same as the zero-embedding operation in FIG. 5, that is, reordering operation may be performed on the zero-embedded sequence $$s' = [s'_0 \ \ldots \ s'_i \ \ldots \ s'_{cM-1}]^T,$$

to determine c zero-embedded subsequence with M elements. For the k th zero-embedded sequence (where k=0, 1, . . . , c−1) of the c zero-embedded subsequences, it can be shown as $$\bar{s}'_k = \left[ s'_{k+c} \ \ldots \ s'_{k+ic} \ \ldots \ s'_{k+(M-1)c} \right]^T,$$

0≤i≤M−1.

By performing size M DFT spreading operation on the above c zero-embedded subsequences, c DFT spreading subsequences can be obtained. For the kth DFT spreading subsequence (where k=0, 1, . . . , c−1) of the c DFT spreading subsequences, it can be shown as $$X'_k = \left[ X'_{k,0} \ \ldots \ X'_{k,i} \ \ldots \ X'_{k,M-1} \right]^T,$$

0≤i≤M−1. Among other things, the relationship between the DFT subsequence $$X'_k$$

and the zero-embedded subsequence $$\bar{s}'_k$$

can be shown by Formula (12).

$$X'_k = F^M s'_k \tag{12}$$

where $F^M$ is a size M DFT matrix. The compressed sequence $X=[X_0 \ \ldots \ X_i \ \ldots \ X_{M-1}]^T$ (0≤i≤M−1) can be obtained by performing phase compensating operation and data superposing operation on the above c DFT spreading subsequences X'. Among other things, the ith element in the compressed sequence X can be calculated by formula (13) as follows.

$$X_i = \sum\nolimits_{k=0}^{c-1} e^{-\frac{j2\pi ki}{cM}} X'_{k,i} =$$

$$\frac{1}{\sqrt{M}} \sum\nolimits_{k=0}^{c-1} e^{-\frac{j2\pi ki}{cM}} \sum\nolimits_{m=0}^{M-1} s'_{k+mc} e^{-\frac{j2\pi im}{M}} = \frac{1}{\sqrt{M}} \sum\nolimits_{m=0}^{cM-1} s'_m e^{-\frac{j2\pi im}{cM}} \tag{13}$$

Afterward, processing unit 120 may further generate a sequence to be transmitted based on the compressed sequence. Compared with the currently provided scheme, the electronic equipment according to the embodiment of the present disclosure can use the same time as the current specific transmission time to transmit more data.

In addition, processing unit 120 may further process the compressed sequence. For example, subcarrier mapping operation, IFFT operation, parallel-to-serial operation, etc. are sequentially performed on the compressed sequence $X=[X_0 \ \ldots \ X_i \ \ldots \ X_{M-1}]^T$, to generate the sequence to be transmitted. In some examples, the processing unit 120 may also perform further data removing operation (not shown) after the IFFT operation and before the parallel-to-serial operation. Therefore, the transmission of a specific amount of data using less time than the transmission time currently required is realized.

In the above process, the processing unit 120 simultaneously realizes DFT orthogonal multiplexing of the head sequence and the tail sequence and DFT non-orthogonal multiplexing of the data sequence by utilizing flexible zero-embedding operation and c size M DFT matrixes, so that the uNOW scheme according to the present disclosure can be integrated with other schemes (e.g., NCP and UW scheme) in the framework of the 6G communication systems, thereby increasing the compatibility and flexibility. Moreover, the compression factor corresponding to the head sequence and the tail sequence is different from that corresponding to the data sequence, so that it can be realized, for example, only the data sequence is compressed without compressing the head sequence and the tail sequence.

Figure 7:
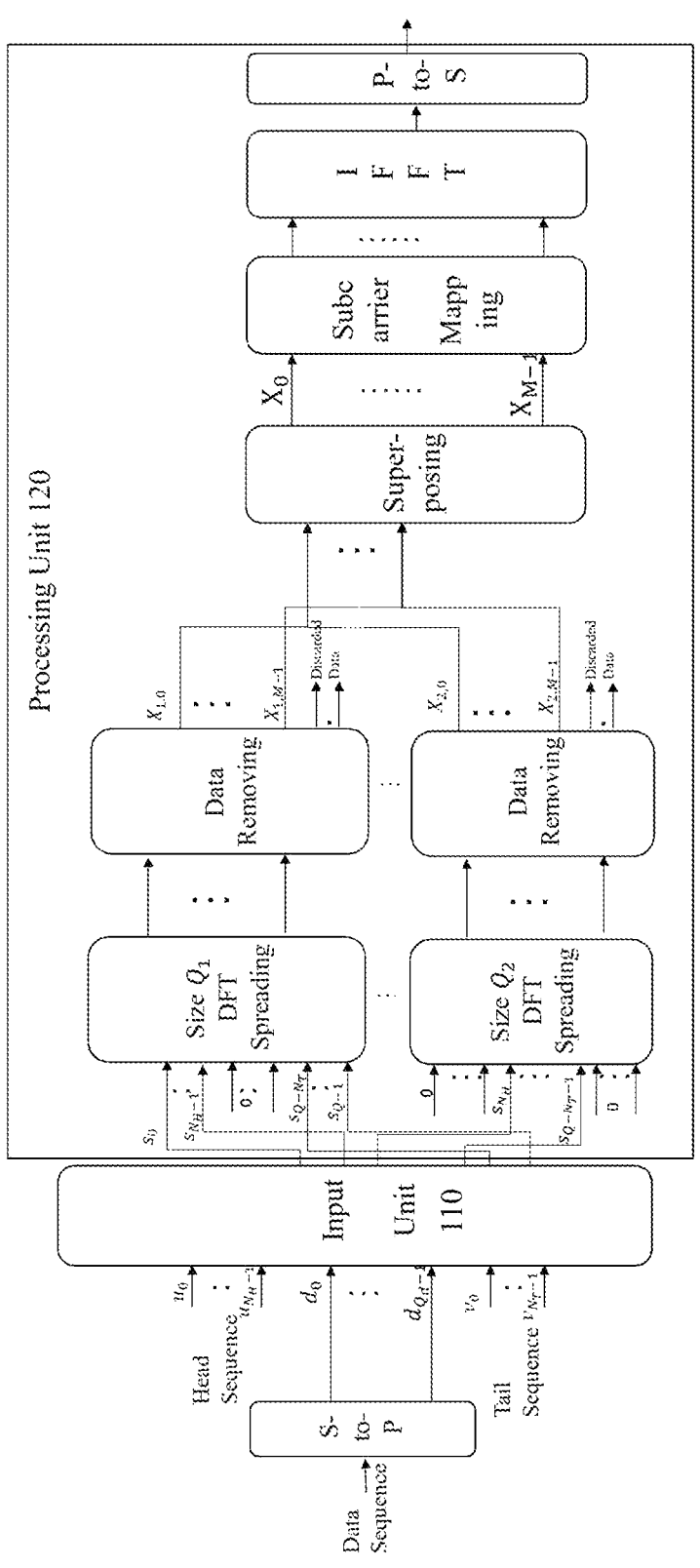
FIG. 7 is a schematic diagram showing signal processing performed by the electronic equipment under the NCP or UW framework according to an embodiment of the present disclosure.

FIG. 7 is another schematic diagram showing signal processing performed by the electronic equipment 100 under the NCP or UW framework according to the embodiment of the present disclosure.

Referring to FIG. 7, the processing unit 120 may be further configured to use one size $Q_1$ DFT matrix and one size $Q_2$ DFT matrix to realize time-domain compression adjustment. For example, the processing unit 120 may perform size $Q_1$ DFT spreading operation and data removing operation on a part of the sequence to be compressed, to obtain a first compressed subsequence, and then perform size $Q_2$ DFT spreading operation and data removing operation on another part of the sequence to be compressed, to obtain a second compressed subsequence. Then data superposing operation is performed on the first compressed subsequence and the second compressed subsequence, to determine the compressed sequence.

Optionally, the size $Q_1$ DFT matrix is used to compress the head sequence and the tail sequence with the first compression factor $$\alpha_1 = \frac{b_1}{c}, \text{ thus } Q_1 = \left\lfloor \frac{M}{\alpha_1} \right\rfloor.$$

The size $Q_2$ DFT matrix is used to compress the data sequence with the second compression factor $$\alpha_2 = \frac{b_2}{c}, \text{ thus } Q_2 = \left\lfloor \frac{M}{\alpha_2} \right\rfloor.$$

As described above, after being processed by input unit 110, the sequence to be compressed $s=[s_0 \ \ldots \ s_i \ \ldots \ s_{Q-1}]^T$ (0≤i≤Q−1) can be obtained. Processing unit 120 may further split the sequence to be compressed $s=[s_0 \ \ldots \ s_i \ \ldots \ s_{Q-1}]^T$ into two subsequences to be compressed: a first subsequence to be compressed $s_u$ and a second subsequence to be compressed $s_d$.

Among other things, the first subsequence to be compressed $s_u=[s_0 \ldots s_{N_H-1} \, 0 \ldots 0 \, s_{Q-N_T} \ldots s_{Q-1}]^T$, where $s_0 \ldots s_{N_H-1}$ represents respective elements in the head sequence $u=[u_0 \ldots u_i \ldots u_{N_H-1}]^T$, and $s_{Q-N_T} \ldots s_{Q-1}$ represents respective elements in the tail sequence $v=[v_0 \ldots v_i \ldots v_{N_T-1}]^T$, then $Q_1-Q$ zeros are padded between the head sequence and the tail sequence.

Among other things, the second subsequence to be compressed $s_d=[0 \ldots 0 \, s_{N_H} \ldots s_{Q-N_T-1} 0 \ldots 0]^T$ where $s_{N_H} \ldots s_{Q-N_T-1}$ represents respective elements in the data sequence $d=[d_0 \ldots d_i \ldots d_{Q_d-1}]^T$. A total of $Q_2-Q$ zeros are padded at the beginning and the ending of the data sequence d by $s_d$.

Next, after performing size $Q_1$ DFT spreading operation on the first subsequence to be compressed $s_u$, a first DFT spreading subsequence $X_1=[X_{1,0} \ldots X_{1,i} \ldots X_{1,Q_1-1}]^T$ $(0 \le i \le Q_1-1)$ can be obtained. Among other things, the relationship between the first DFT spreading subsequence $X_1$ and the first subsequence to be compressed $s_u$ can be shown by Formula (14).

$$X_1 = F^{Q_1} s_u \qquad (14)$$

where $F^{Q_1}$ is a size $Q_1$ DFT matrix. Among other things, for the ith element in the first DFT spreading subsequence $X_1$, it can be calculated by formula (15) as follows.

$$X_{1,i} = \frac{1}{\sqrt{M}} \sum_{m=0}^{Q_1-1} S_{u,m} e^{-\frac{j2\pi i m}{Q_1}} \qquad (15)$$

Then, after performing size $Q_2$ DFT spreading operation on the second subsequence to be compressed $s_d$, a second DFT spreading subsequence $X_2=[X_{2,0} \ldots X_{2,i} \ldots X_{2,Q_1-1}]^T$ $(0 \le i \le Q_2-1)$ can be obtained. The relationship between the second DFT spreading subsequence $X_2$ and the second subsequence to be compressed $s_d$ can be shown by Formula (16).

$$X_2 = F^{Q_2} s_d \qquad (16)$$

where $F^{Q_2}$ is a size $Q_2$ DFT matrix. Among other things, for the ith element in the second DFT spreading subsequence $X_2$, it can be calculated as follows by formula (17).

$$X_{2,i} = \frac{1}{\sqrt{M}} \sum_{m=0}^{Q_2-1} s_{d,m} e^{-\frac{j2\pi i m}{Q_2}} \qquad (17)$$

The compressed sequence $X=[X_0 \ldots X_i \ldots X_{M-1}]^T$ $(0 \le i \le M-1)$ can be obtained by performing data removing operation and data superposing operation on the first DFT spreading subsequence $X_1$ and the second DFT spreading subsequence $X_2$. Among other things, ith element in the compressed sequence X can be calculated by formula (18) as follows.

$$X_i = \qquad (18)$$

$$X_{1,i} + X_{2,i} = \frac{1}{\sqrt{M}} \sum_{m=0}^{Q_1-1} s_{u,m} e^{-\frac{j2\pi i m}{M/\alpha_1}} + \frac{1}{\sqrt{M}} \sum_{m=0}^{Q_2-1} s_{d,m} e^{-\frac{j2\pi i m}{M/\alpha_2}} =$$

$$\frac{1}{\sqrt{M}} \sum_{m=0}^{Q_1-1} s_{u,m} e^{-\frac{j2\pi i \left(\frac{b_1}{c} m\right)}{M}} + \frac{1}{\sqrt{M}} \sum_{m=0}^{Q_2-1} s_{d,m} e^{-\frac{j2\pi i \left(\frac{b_2}{c} m\right)}{M}} =$$

$$\frac{1}{\sqrt{M}} \sum_{m=0}^{cM-1} s'_m e^{-\frac{j2\pi i m}{cM}}$$

Afterward, processing unit 120 may further generate a sequence to be transmitted based on the compressed sequence. Compared with the currently provided scheme, the electronic equipment according to the embodiment of the present disclosure can use the same time as the current specific transmission time to transmit more data.

In the above process, the processing unit 120 simultaneously realizes DFT orthogonal multiplexing of the head sequence and the tail sequence and DFT non-orthogonal multiplexing of the data sequence by utilizing one size $Q_1$ DFT matrix, one size $Q_2$ DFT matrix and data removing operation, so that the uNOW scheme according to the present disclosure can be integrated with other schemes (e.g., NCP and UW schemes) in the framework of the 6G communication systems, thereby increasing the compatibility and flexibility. Moreover, the compression factor corresponding to the head sequence and the tail sequence is different from that corresponding to the data sequence, so that it can be realized, for example, only the data sequence is compressed without compressing the head sequence and the tail sequence.

Hereinafter, an electronic equipment 800 according to an embodiment of the present disclosure will be described with reference to FIG. 8. FIG. 8 is a schematic block diagram showing the electronic equipment 800 according to an embodiment of the present disclosure. The electronic equipment 800 can perform signal processing in combination with FDSS, to determine the sequence to be transmitted involved in the above uNOW scheme.

As shown in FIG. 8, the electronic equipment 800 according to the embodiment of the present disclosure may be used as a part of a transmitting end in a communication system. For example, the electronic equipment 800 may be a part of a base station or a user terminal. Hereinafter, the embodiments of the present disclosure will be described by taking a 5G evolution communication network and a 6G communication network as examples, but it should be recognized that the following description can also be applicable to other types of wireless communication networks.

As shown in FIG. 8, the electronic equipment 800 may include an input unit 880 and a processing unit 820. In addition to the input unit 880 and the processing unit 820, the electronic equipment 800 may further include other components (such as a transmitting unit for transmitting a compressed sequence, such as an antenna, etc.) which, however, are irrelevant to the disclosure of the embodiments of the present disclosure, thus the illustrations and descriptions thereof are omitted here.

As shown in FIG. 8, the input unit 810 is configured to: determine a sequence to be compressed based on a data sequence. The processing unit 820 is configured to: determine, based on the sequence to be compressed, a compressed sequence by utilizing discrete Fourier transform spreading, and determine, based on the compressed sequence, a sequence to be transmitted by utilizing frequency-domain spectrum shaping.

Optionally, in the case where the electronic equipment 800 acquires a cyclic prefix indicator through RRC signaling, MAC CE signaling or DCI signaling, the processing unit 820 further adds a cyclic prefix sequence to the sequence to be transmitted. For example, the cyclic prefix indicator indicates whether it is required to add a cyclic prefix sequence to the sequence to be transmitted. If it is required to a cyclic prefix sequence to the sequence to be transmitted, it implies that the electronic equipment 800 does not need to generate the sequence to be compressed through the head sequence and the tail sequence. That is, at this time, the electronic equipment 800 is not applied to the DFT-s-OFDM system under the NCP or UW architecture. At this time, the sequence to be compressed s is the same as the data sequence d. That is, the sequence to be compressed $s=[s_0 \ldots s_i \ldots s_{Q-1}]^T = d = [d_0 \ldots d_i \ldots d_{Q_d-1}]^T$, $0 \leq i \leq Q-1 = Q_d-1$. The way in which the processing unit 820 determines the compressed sequence based on the sequence to be compressed s is similar to that of the processing unit 120, which will not be detailed here. In some examples, the electronic equipment 800 needs to add a cyclic prefix sequence to the sequence to be transmitted by default, unless the cyclic prefix indicator indicates not to add a cyclic prefix sequence.

Optionally, the input unit 810 may determine, when provided with the head sequence and the tail sequence, the sequence to be compressed based on the data sequence, the head sequence, and the tail sequence. In this case, the electronic equipment 800 will be applied to the DFT-s-OFDM system under the NCP or UW architecture. At this time, the operations performed by the input unit 810 may be the same as or similar to those performed by the above input unit 110, that is, the input unit 810 may be further configured to: determine a sequence to be compressed based on input data sequence, head sequence and tail sequence, wherein the sequence to be compressed has Q elements, and Q is an integer greater than 0. The way in which the processing unit 820 determines the compressed sequence is similar to that of the processing unit 120. That is, the processing unit 820 is further configured to: determine, based on the sequence to be compressed, a DFT spreading sequence by utilizing DFT spreading, and perform at least one of data deleting operation or data superposing operation on the DFT spreading sequence, to determine a compressed sequence, wherein the compressed sequence has M symbols, M is an integer greater than 0, and M is less than Q. The determination of the compressed sequence by the processing unit 820 will not be detailed here.

As described above, it is assumed that the compressed sequence is $X=[X_0 \ldots X_i \ldots X_{M-1}]^T$, $0 \leq i \leq M-1$. The sequence to be transmitted $\tilde{X}=[\tilde{X}_0 \ldots \tilde{X}_i \ldots \tilde{X}_{M-1}]^T$ $(0 \leq i \leq M-1)$ can be obtained by utilizing frequency-domain spectrum shaping. The ith element $\tilde{X}_i$ in the sequence to be transmitted $\tilde{X}$ can be calculated by formula (19) as follows.

$$\tilde{X}_i = p_i X_i \tag{19}$$

where, $p=[p_0 \ldots p_i \ldots p_{M-1}]^T$, $0 \leq i \leq M-1$. $p=[p_0 \ldots p_i \ldots p_{M-1}]^T$ is a vector used for frequency-domain spectral shaping, and $$\sum_{i=0}^{M-1} p_i^2 = 1.$$

In addition, since the equivalent pulse shape will be changed if only the frequency-domain spectrum shaping operation (FDSS) is performed, inter symbol interference (ISI) will be introduced, when the processing unit 820 is performing the frequency-domain spectrum shaping operation, it can also first perform spreading operation on the compressed sequence, to determine a spreading sequence, and then perform the frequency-domain spectrum shaping operation on the spreading sequence, to determine the sequence to be transmitted. The spreading operation can reduce ISI.

Illustrations are made continuing to take the compressed sequence $X=[X_0 \ldots X_i \ldots X_{M-1}]^T$ as an example. By performing a spreading operation on the compressed sequence, a spreading sequence $$\tilde{X}' = \begin{bmatrix} \tilde{X}'_0 & \ldots & X'_i & \ldots & \tilde{X}'_{L-1} \end{bmatrix}^T$$

$(0 \leq i \leq L-1)$ can be obtained. Among other things, the ith element $$\tilde{X}'_i$$

in the spreading sequence $\tilde{X}'$ can be calculated by formula (20) as follows.

$$\tilde{X}'_i = X_i \left( \left( i + M - \frac{L-M}{2} \right), \text{mod } M \right) \tag{20}$$

where mod M represents an operation of taking the remainder. Formula (20) indicates that for the $$\left( i + M - \frac{L-M}{2} \right) th$$

element in the compressed sequence $X=[X_0 \ldots X_i \ldots X_{M-1}]^T$, after the spreading operation, it will be the ith element in the spreading sequence $$\tilde{X}' = \begin{bmatrix} \tilde{X}'_0 \ldots & \tilde{X}'_i \ldots & \tilde{X}'_{L-1} \end{bmatrix}^T \cdot \left( \left( i + M - \frac{L-M}{2} \right), \text{mod } M \right)$$

represents the correspondence before and after the spreading operation. Formula (20) can be equivalent to Formula (21).

$$\tilde{X}'_i = \begin{cases} X_{i+m-\frac{L-M}{2}}, & 0 \leq i \leq \frac{L-M}{2} - 1 \\ X_{i-\frac{L-M}{2}}, & \frac{L-M}{2} \leq i \leq \frac{L+M}{2} - 1 \\ X_{i-M-\frac{L-M}{2}}, & \frac{L+M}{2} \leq i \leq L-1 \end{cases} \tag{21}$$

Therefore, a combination of time-domain compression adjustment and frequency-domain spectrum shaping is realized by performing frequency-domain spectrum shaping on the compressed sequence, thereby increasing the performances of PAPR, OOBE and SE of the DFT-s-OFDM waveform while compressing time-domain symbols. In addition, the uNOW scheme according to the present disclosure can be integrated with other schemes (e.g., FDSS) in the framework of 6G communication systems, thereby increasing the compatibility and flexibility.

Hereinafter, various methods according to embodiments of the present disclosure will be described with reference to FIGS. 9 and 10.

FIG. 9 is a flowchart of a method 9000 performed by the electronic equipment 100 according to an embodiment of the present disclosure. Since the steps of the method 9000 performed by the electronic equipment 100 correspond to the operations of the electronic equipment 100 described above with reference to the figures, the detailed description of the same contents is omitted here for the sake of simplicity.

As shown in FIG. 9, in step S9001, the electronic equipment 100 determines a sequence to be compressed based on a data sequence, a header sequence and a trailer sequence, wherein the sequence to be compressed has Q elements, and Q is an integer greater than 0. In step S9002, the electronic equipment 100 determines, based on the sequence to be compressed, a DFT spreading sequence by utilizing DFT spreading, and performs at least one of data deleting operation or data superposing operation on the DFT spreading sequence, to determine a compressed sequence, wherein the compressed sequence has M symbols, M is an integer greater than 0, and M is less than Q.

Therefore, method 9000 realizes flexible time-domain compression adjustment by performing irregular zero-padding operation on the sequence to be compressed before DFT operation. In addition, the uNOW scheme according to the present disclosure can be integrated with other schemes (such as NCP and UW) in the framework of 6G communication systems, thereby increasing compatibility and flexibility.

FIG. 10 is a flowchart of method 10000 performed by electronic equipment 800 according to an embodiment of the present disclosure. Since the steps of method 10000 performed by electronic equipment 800 correspond to the operations of the electronic equipment 800 described above with reference to the drawings, a detailed description of the same content is omitted here for the sake of simplicity.

As shown in FIG. 10, in step S10001, electronic equipment 800 determines a sequence to be compressed based on a data sequence. In step S10002, electronic equipment 800 determines, based on the sequence to be compressed, a compressed sequence by utilizing discrete Fourier transform spreading, and determines, based on the compressed sequence, a sequence to be transmitted by utilizing frequency-domain spectrum shaping.

The method 10000 realizes a combination of time-domain compression adjustment and frequency-domain spectrum shaping by performing frequency-domain spectrum shaping on the compressed sequence. In addition, the uNOW scheme according to the present disclosure can be integrated with other schemes (such as FDSS) in the framework of 6G communication systems, thereby increasing compatibility and flexibility.

<Hardware Structure>

Additionally, the block diagrams used in the illustration of the above implementations show blocks in units of functions. Such functional blocks (structural units) are implemented by any combination of hardware and/or software. In addition, the implementing means for respective functional blocks is not particularly limited. That is, respective functional blocks can be implemented by one physically and/or logically combined device, or can be implemented by directly and/or indirectly connecting (e.g., by wire and/or wireless) two or more devices that are physically and/or logically separated.

For example, an electronic equipment according to an embodiment of the present disclosure can function as a computer performing the processing of the information sending method of the present disclosure. FIG. 10 is a schematic diagram of a hardware structure of an involved equipment 1000 (electronic equipment) according to an embodiment of the present disclosure. The above equipment 1000 (first network element) can be composed as a computer device that physically includes a processor 1010, a memory 1020, a storage 1030, a communication device 1040, an input device 1050, an output device 1060, a bus 1070, etc.

Additionally, in the following illustration, word such as "device" can be replaced by circuit, equipment, unit, etc. The hardware structure of the electronic equipment may include respective devices shown in one or more drawings, or may not include some of the devices.

For example, only one processor 1010 is illustrated, but there may be multiple processors. In addition, the processing may be performed by one processor, or by more than one processor concurrently, sequentially, or by other methods. Additionally, the processor 1010 may be installed by means of more than one chip.

For example, respective functions of the equipment 1000 is implemented by: reading a specified software (program) onto hardware such as the processor 1010, the memory 1020 and the like, so that the processor 1010 performs operations, controls communication by the communication device 1040, and controls reading and/or writing of data in the memory 1020 and the storage 1030.

For example, the processor 1010 drives an operating system to operate to control the computer as a whole. The processor 1010 may be composed of a Central Processing Unit (CPU) including interfaces with peripheral devices, control devices, arithmetic devices, registers, etc. For example, such control units described above can be implemented by the processor 1010.

In addition, the processor 1010 reads out programs (program codes), software modules, data, and/or the like from the storage 1030 and/or the communication device 1040 to the memory 1020, and performs various processing according to them. As a program, a program that causes the computer to execute at least a part of the actions illustrated in the above-described implementations can be adopted. For example, the processing unit of the first network element can be implemented by a control program saved in the memory 1020 and operated by the processor 1010, and other functional blocks can be implemented in the same way.

The memory 1020 is a computer-readable recording medium, which can be composed of at least one of, for example, a Read Only Memory (ROM), an Erasable Programmable ROM (EPROM), an Electrically EPROM (EEPROM), a Random Access Memory (RAM), and other appropriate storage media. The memory 1020 can also be referred to as a register, a cache, a main memory (main storage device), etc. The memory 1020 may save executable programs (program codes), software modules, and/or the like for implementing the method involved in an implementation of the present disclosure.

The storage 1030 is a computer-readable recording medium, which can be composed of, for example, a flexible disk, a floppy disk, a magneto-optical disk (e.g., a compact disk ROM (CD-ROM), etc.), a digital versatile disc, a Blu-ray® disc, a removable disk, a hard disk drive, a smart card, a flash memory device (e.g., a card, a stick, a key driver), a magnetic stripe, a database, a server, and other appropriate storage media. The storage 1030 can also be referred to as a secondary storage device.

The communication device 1040 is a hardware (sending and receiving device) for communication between computers through wired and/or wireless networks, which is also referred to as, for example, a network equipment, a network controller, a network card, a communication module, etc. In order to implement, for example, Frequency Division Duplex (FDD) and/or Time Division Duplex (TDD), the communication device 1040 may include a high-frequency switch, a duplexer, a filter, a frequency synthesizer etc. For example, the above-described sending unit, receiving unit, and/or the like can be implemented by the communication device 1040.

The input device 1050 is an input equipment (e.g., a keyboard, a mouse, a microphone, a switch, a button, a sensor, etc.) that accepts input from the outside. The output device 1060 is an output equipment (e.g., a display, a speaker, a Light Emitting Diode (LED) lamp, etc.) that realizes output to the outside. Additionally, the input device 1050 and the output device 1060 may also be an integrated structure (e.g., a touch panel).

In addition, respective devices such as the processor 1010, the memory 1020 and/or the like are connected through the bus 1070 for communicating information. The bus 1070 may be composed of either a single bus, or different buses among devices.

In addition, the electronic equipment may include a hardware such as a microprocessor, a Digital Signal Processor (DSP), an application specific integrated circuit (ASIC), a Programmable Logic Device (PLD), a Field Programmable Gate Array (FPGA) and/or the like, by which part or all of respective functional blocks can be implemented. For example, the processor 1010 may be installed by means of at least one piece of such hardware.

(Variation)

Additionally, terms illustrated in the specification and/or terms required to understand the specification can be interchanged with terms with same or similar meanings. For example, a channel and/or symbol can also be a signal (signaling). In addition, a signal can also be a message. A reference signal can also be referred to as a Reference Signal (RS) for short, or can also be referred to as a Pilot, a pilot signal, and/or the like according to the applied standard. In addition, a Component Carrier (CC) can also be referred to as a cell, a frequency carrier, a carrier frequency, etc.

In addition, information, parameter, and/or the like illustrated in the specification can be expressed by an absolute value, or by a relative value with respect to a specified value, or by other corresponding information. For example, a radio resource can be indicated by a specified index. Further, a formula and/or the like using such parameters can be different from that explicitly disclosed in the specification.

Names used for parameters and/or the like in the specification are not restrictive in any aspect. For example, various channels (Physical Uplink Control Channel (PUCCH), Physical Downlink Control Channel (PDCCH), etc.) and information units can be identified by any appropriate names, thus these various names allocated to these various channels and information units are not restrictive in any aspect.

Information, signals, and/or the like illustrated in the specification can be expressed by any of a wide variety of different technologies. For example, data, command, instruction, information, signals, bits, symbols, chips, and/or the like that might be mentioned in all the above illustrations can be expressed by voltages, currents electromagnetic waves, magnetic fields or particles, optical fields or photons, or any combination thereof.

In addition, information, signals, and/or the like may be output from the upper laver to the lower layer and/or from the lower layer to the upper layer. Information, signals, and/or the like may be input or output via multiple network nodes.

The input or output information, signals, and/or the like may be saved in a specific place (e.g., memory) or managed by a management table. The input or output information, signals, and/or the like may be overwritten, updated or supplemented. The output information, signals, and/or the like may be deleted. The input information, signals, and/or the like may be sent to other devices.

The notification of information is not limited to the approaches/implementations illustrated in the specification, but can also be carried out by other methods. For example, the notification of information can be implemented by physical layer signaling (e.g., Downlink Control Information (DCI), Uplink Control Information (UCI)), upper layer signaling (e.g., Radio Resource Control (RRC) signaling, broadcast information (Master Information Block (MIB), System Information Block (SIB), etc.), Medium Access Control (MAC) signaling), other signals, or combinations thereof.

Additionally, physical layer signaling can also be referred to as L1/L2 (Layer 1/Layer 2) control information (L1/L2 control signal), L1 control information (L1 control signal) and so on. In addition, RRC signaling can also be referred to as RRC message, such as RRC Connection Setup message, RRC Connection Reconfiguration message, etc. Furthermore, the MAC signaling may be notified by a MAC Control Element (MAC CE), for example.

In addition, the notification of specified information (e.g., notification of "X") is not limited to being carried out explicitly, but can also be carried out implicitly (e.g., by not notifying the specified information, or by notifying other information).

Determinations can be carried out by means of a value (0 or 1) represented by one bit, or by means of a Boolean value represented by true or false, or by means of a numerical comparison (e.g., comparison with a specified value).

Software, whether being referred to as software, firmware, middleware, microcode, hardware description language or some other name, should be broadly interpreted as referring to commands, command sets, codes, code segments, program codes, programs, subroutines, software modules, application programs, software application programs, software packages, routines, subroutines, objects, executable files, execution threads, steps, functions, etc.

In addition, software, commands, information, and/or the like can be sent or received via transmission medium. For example, when software is sent from websites, servers, or some other remote resources using wired technologies (coaxial cable, optical cable, twisted pair, Digital Subscriber Line (DSL), etc.) and/or wireless technologies (infrared, microwave, etc.), such wired technologies and/or wireless technologies are included in the definition of transmission medium.

Terms such as "system" and "network" used in the specification can be used interchangeably.

In the specification, terms such as Base Station (BS), wireless base station, eNB, gNB, cell, sector, cell group, carrier and component carrier can be used interchangeably. Abase station is sometimes referred to as a fixed station, a NodeB, an eNB, an access point, a sending point, a receiving point, a femtocell, a small cell, etc.

A base station can accommodate one or more (e.g., three) cells (also referred to as sectors). When a base station accommodates multiple cells, the entire coverage area of the base station can be divided into multiple smaller areas, each of which can also provide communication services through a base station subsystem (e.g., an indoor small base station (Remote Radio Head, RRH)). A term such as "cell" or "sector" refers to a part or the whole of the coverage area of the base station and/or base station subsystem that provides communication services in the coverage.

In the specification, terms such as "MS (Mobile Station)", "user terminal", "UE (User Equipment)" and "terminal" can be used interchangeably. A mobile station is sometimes referred to by those skilled in the art as a subscriber station, a mobile unit, a subscriber unit, a wireless unit, a remote unit, a mobile equipment, a wireless equipment, a wireless communication equipment, a remote equipment, a mobile subscriber station, an access terminal, a mobile terminal, a wireless terminal, a remote terminal, a handset, a user agent, a mobile client, a client or some other appropriate term.

In addition, wireless base station in the specification can also be replaced by user terminal. For example, the various approaches/implementations of the present disclosure can also be applied to a structure in which a communication between a wireless base station and a user terminal is replaced by a communication among multiple user terminals (Device-to-Device, D2D). At this time, the functions embodied by the above-described electronic equipment can be regarded as the functions embodied by the user terminal. In addition, words such as "uplink" and "downlink" can also be replaced by "side". For example, "uplink channel" can also be replaced by "side channel".

Similarly, user terminal in the specification can also be replaced by wireless base station. At this time, the functions embodied by the user terminal can be regarded as the functions embodied by a first communication equipment or a second communication equipment.

In the specification, it is assumed that a specific action carried out by a base station is sometimes carried out by its upper node as appropriate. Obviously, in a network composed of one or more network nodes with a base station, a wide variety of actions carried out for communications with terminals can be performed by a base station, more than one network node except for the base station (e.g., Mobility Management Entity (MME), Serving-Gateway (S-GW), and/or the like, can be taken into account, but not limited to this), or combinations thereof.

The various approaches/implementations illustrated in the specification can be used alone or in combination, or can also be used by switching during execution. In addition, the orders in the processing steps, sequences, flowcharts, and/or the like of the various approaches/implementations illustrated in the specification can be changed as long as there is no contradiction. For example, with respect to the method illustrated in the specification, a wide variety of step units are given in an exemplary order, which are not limited to the specific order given.

The various approaches/implementations illustrated in the specification can be applied to systems and/or next-generation systems extended based thereon with Long Term Evolution (LTE), LTE-Advanced (LTE-A), LTE-Beyond (LTE-B), super $3^{rd}$ generation mobile communication system (SUPER 3G), international mobile communication-Advanced (IMT Advanced), $4^{th}$ generation mobile communication system (4G), $5^{th}$ generation mobile communication system (5G), Future Radio Access (FRA), New Radio Access Technology (New-RAT), New Radio (NR), New Radio Access (NX), Future generation radio access (FX), Global System for Mobile Communications (GSM®), Code Division Multiple Access 3000 (CDMA3000), Ultra Mobile Broadband (UMB), IEEE 920.11 (Wi-Fi®), IEEE 920.16 (WIMAX®), IEEE 920.20, Ultra-WideBand (UWB), Bluetooth®, other appropriate wireless communication methods.

The recitations such as "according to" used in the specification does not mean "only according to" unless explicitly recited as such in other paragraphs. In other words, the recitations such as "according to" refers to both "only according to" and "at least according to".

Any reference to units with ordinal numerals such as "first" and "second" used in the specification does not comprehensively limit the number or order of these units. Such names can be used in the specification as a convenient way to distinguish two or more units. Therefore, the reference to a first unit and a second unit does not mean that only two units can be adopted or that the first unit must precede the second unit in some way.

Terms such as "judging (determining)" used in the specification sometimes includes various actions. For example, "judging (determining)" can refer to calculating, computing, processing, deriving, investigating, looking up (e.g., searching in a table, a database or some other data structure), ascertaining, etc. In addition, "judging (determining)" can also refer to receiving (e.g., receiving information), transmitting (e.g., transmitting information), input, output, accessing (e.g., accessing data in memory), etc. In addition, "judging (determining)" can also refer to resolving, selecting, choosing, establishing, comparing, etc. That is, "judging (determining)" can refer to several actions.

Terms such as "connected" and "coupled" used in the specification or any variation thereof refer to any direct or indirect connection or combination among two or more units, which may include a case in which there are one or more intermediate unit between two units that are "connected" or "combined" with each other. The combination or connection among units can be physical, logical or a combination of both. For example, "connected" can also be replaced by "accessed". As used in the specification, it can be considered that two units are "connected" or "combined" with each other by using one or more wires, cables, and/or printed electrical connections, and as some non-restrictive and non-exhaustive examples, by using electromagnetic energy with a wavelength of a radio frequency region, a microwave region, and/or a light (both visible and invisible) region, etc.

As used in the specification or claims, terms such as "including", "comprising" and variations thereof, as well as the term "having", are equally open. Further, the term "or" used in the specification or claims is not exclusive-or.

The present disclosure has been described in detail above, but it is obvious to those skilled in the art that the present disclosure is not limited to the implementations illustrated in the specification. The present disclosure can be implemented as modification and alteration thereto without departing from the purpose and scope of the present disclosure determined by the recitations of the claims. Therefore, the recitations of the specification is for the purpose of illustration and does not have any restrictive significance to the present disclosure.

What is claimed is:

1. An electronic equipment, comprising:

a memory; and one or more processor, configured to:

determine a sequence to be compressed based on a data sequence, a head sequence and a tail sequence, wherein the sequence to be compressed has Q elements, and Q is an integer greater than 0;

perform zero-padding operation on the sequence to be compressed according to at least a first compression factor and/or a second compression factor, to determine a zero-embedded sequence, perform Discrete Fourier Transform (DFT) spreading operation on the zero-embedded sequence, to determine a DFT spreading sequence; and perform at least one of data deleting operation or data superposing operation on the DFT spreading sequence to determine a compressed sequence, wherein the compressed sequence has M symbols, Mis an integer greater than 0, and Mis less than Q, wherein the first compression factor indicates a ratio of the data amount of the head sequence and the tail sequence in the sequence to be compressed to the data amount of the head sequence and the tail sequence in the compressed sequence, the second compression factor indicates a ratio of the data amount of the data sequence in the sequence to be compressed to the data amount of the data sequence in the compressed sequence, and the first compression factor is the same as or different from the second compression factor.

2. The electronic equipment of claim 1, wherein the one or more processor is further configured to:

perform data removing operation on the DFT spreading sequence, to determine the compressed sequence.

3. The electronic equipment of claim 1, wherein the one or more processor is further configured to:

perform reordering operation on the zero-embedded sequence, to determine a plurality of zero-embedded subsequences;

perform DFT spreading operation on the plurality of zero-embedded subsequences, to determine a plurality of DFT spreading subsequences, perform phase compensating operation on each of the plurality of DFT spreading subsequences, and perform data superposing operation on the DFT spreading subsequences on which the phase compensating operation has been performed, to determine the compressed sequence.

4. The electronic equipment of claim 1, wherein, in the case where the electronic equipment is applied to a discrete Fourier transform spread orthogonal frequency division multiplexing (DFT-s-OFDM) system with null cyclic prefix (NCP), the elements in the head sequence and the tail sequence are all zero, in the case where the electronic equipment is applied to a discrete Fourier transform spread orthogonal frequency division multiplexing (DFT-s-OFDM) system with unique words (UW), the head sequence and the trail sequence are predefined sequences.

5. An electronic equipment, comprising:

a memory; and one or more processor, configured to:

determine a sequence to be compressed based on a data sequence;

determine, based on the sequence to be compressed, a compressed sequence by utilizing discrete Fourier transform spreading, perform spreading operation on the compressed sequence, to determine a spreading sequence; and perform frequency-domain spectrum shaping operation on the spreading sequence, to determine the sequence to be transmitted.

6. The electronic equipment of claim 5, wherein the one or more processor is further configured to:

add a cyclic prefix sequence to the sequence to be transmitted based on a cyclic prefix indicator, wherein the cyclic prefix indicator is included in Radio Resource Control (RRC) signaling, Medium Access Control (MAC) Control Element (CE) signaling or Downlink Control Information (DCI) signaling.

* * * * *